US012800527B2

(12) United States Patent
Konno et al.

(10) Patent No.: US 12,800,527 B2
(45) Date of Patent: Nov. 17, 2026

(54) ANALYSIS SYSTEM

(71) Applicant: Hitachi High-Tech Corporation, Tokyo (JP)

(72) Inventors: Azusa Konno, Tokyo (JP); Ichiro Fujimura, Tokyo (JP); Toru Aiso, Tokyo (JP); Kazuhiro Koyama, Tokyo (JP); Takashi Shidara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 313 days.

(21) Appl. No.: 18/695,035

(22) PCT Filed: Sep. 30, 2021

(86) PCT No.: PCT/JP2021/036215
§ 371 (c)(1),
(2) Date: Mar. 25, 2024

(87) PCT Pub. No.: WO2023/053373
PCT Pub. Date: Apr. 6, 2023

(65) Prior Publication Data

US 2024/0393270 A1 Nov. 28, 2024

(51) Int. Cl.
*G01N 23/2251* (2018.01)
*G01B 11/24* (2006.01)

(52) U.S. Cl.
CPC ..... *G01N 23/2251* (2013.01); *G01B 11/2441* (2013.01); *G01N 2223/6116* (2013.01)

(58) Field of Classification Search
CPC ............... G01B 11/2441; G01N 23/04; G01N 23/2251; G01N 2223/3301;
(Continued)

(56) References Cited

U.S. PATENT DOCUMENTS 4,733,074 A * 3/1988 Kato ........................ H01J 37/28 250/307
2007/0023651 A1* 2/2007 Ishitani ................ G01N 23/225 250/309

(Continued)

FOREIGN PATENT DOCUMENTS

JP 2010-97768 A 4/2010
JP 2015-129928 A 7/2015

(Continued)

OTHER PUBLICATIONS

International Search Report (PCT/ISA/210) issued in PCT Application No. PCT/JP2021/036215 dated Dec. 21, 2021 with English translation (4 pages).

(Continued)

*Primary Examiner* — Jason L Mccormack
(74) *Attorney, Agent, or Firm* — Crowell & Moring LLP

(57) ABSTRACT

A technology capable of acquiring depth information of a sample quickly and accurately is provided. A computer system in an analysis system acquires 3-dimensional coordinate information of a top surface shape of a sample having a stacking structure, the 3-dimensional coordinate information being measured by a top surface shape measurement apparatus (CSI), acquires 2-dimensional coordinate information based on a photographic image of the sample imaged by a charged particle beam apparatus (SEM), performs coordinate conversion for association between the 3-dimensional coordinate information of the CSI and the 2-dimensional coordinate information of the SEM and acquires association data which is a result, and acquires depth information on a coordinate system of the SEM based on the association data.

10 Claims, 21 Drawing Sheets

(58) Field of Classification Search

CPC .. G01N 2223/6116; H01J 37/00; H01J 37/02; H01J 37/10; H01J 37/20; H01J 37/22; H01J 37/222; H01J 37/244; H01J 37/26; H01J 37/265; H01J 37/28; H01J 2237/204

USPC .......................................... 250/306, 307, 311

See application file for complete search history.

(56) References Cited

U.S. PATENT DOCUMENTS

| | | | | |
|---|---|---|---|---|
| 2010/0091362 | A1 | 4/2010 | Isozaki et al. | |
| 2013/0284924 | A1* | 10/2013 | Mizuochi ........... | G01N 23/2206<br>250/310 |
| 2015/0169997 | A1 | 6/2015 | Weber et al. | |
| 2017/0062175 | A1 | 3/2017 | Ando | |
| 2017/0138725 | A1 | 5/2017 | Kawada et al. | |

FOREIGN PATENT DOCUMENTS

| | | | |
|---|---|---|---|
| JP | 2017-050120 | A | 3/2017 |
| WO | WO 2016/002341 | A1 | 1/2016 |

OTHER PUBLICATIONS

Japanese-language Written Opinion (PCT/ISA/237) issued in PCT Application No. PCT/JP2021/036215 dated Dec. 21, 2021 with English translation (9 pages).

* cited by examiner

[FIG 1]
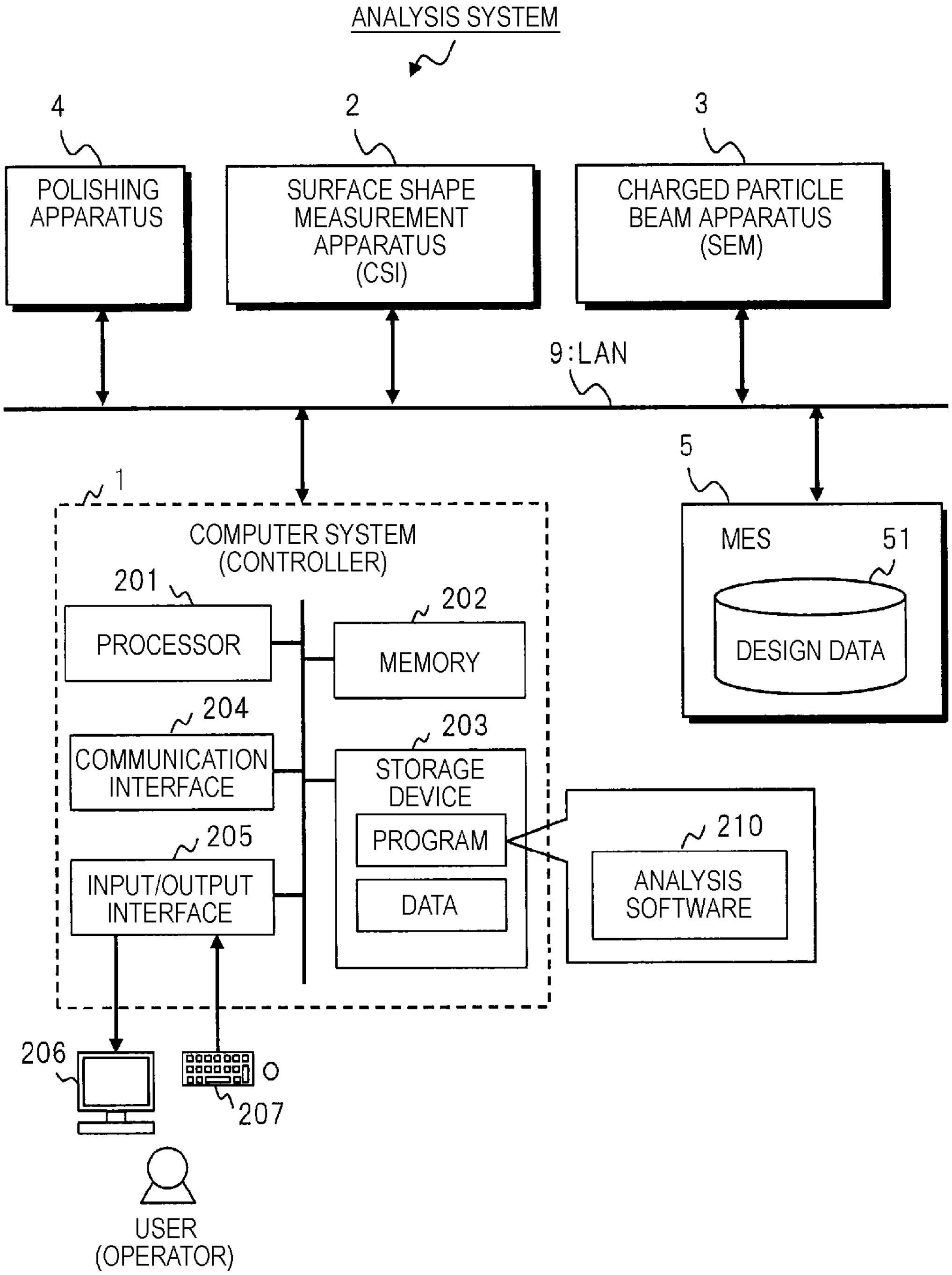

[FIG 2]
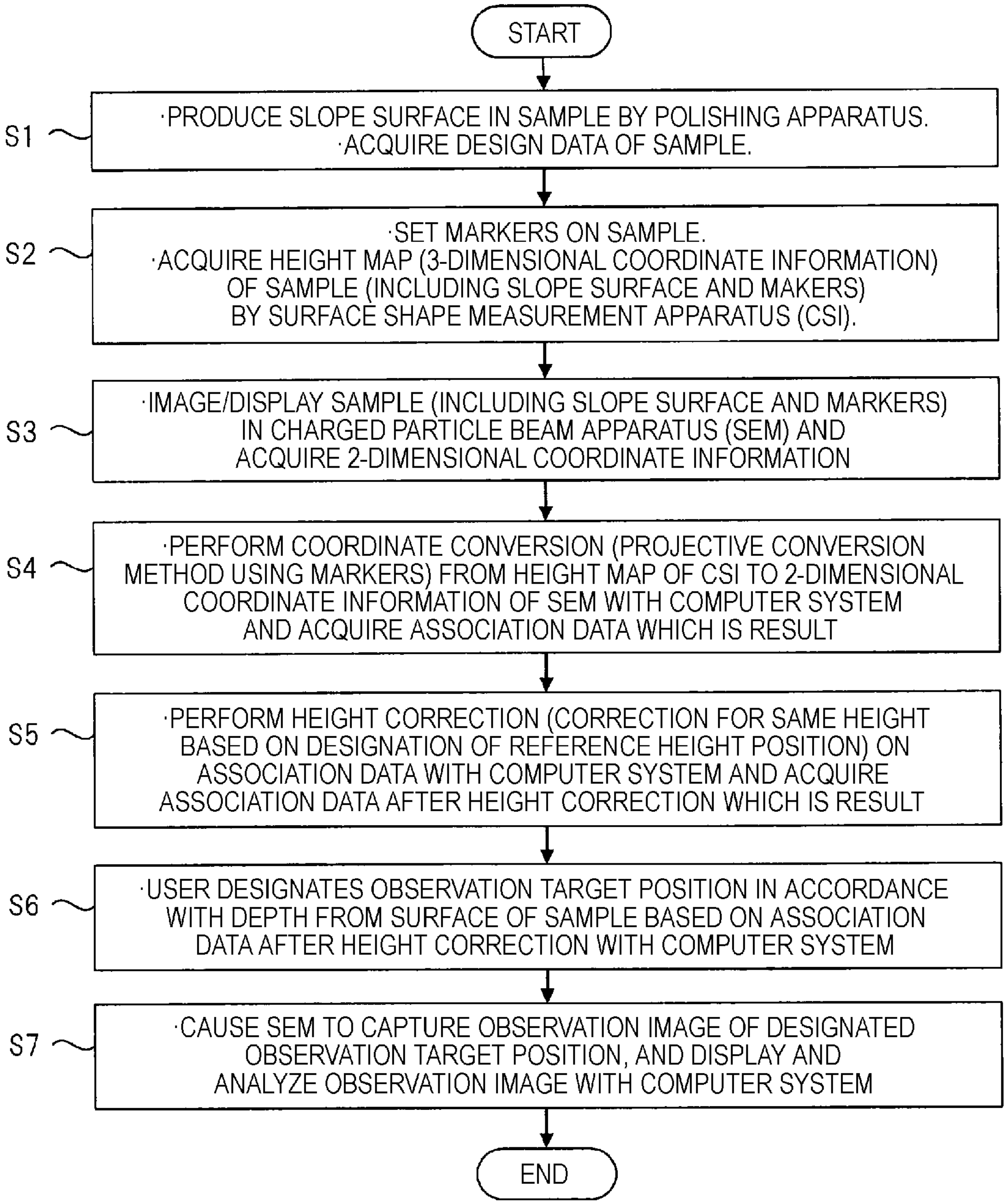

[FIG. 3]
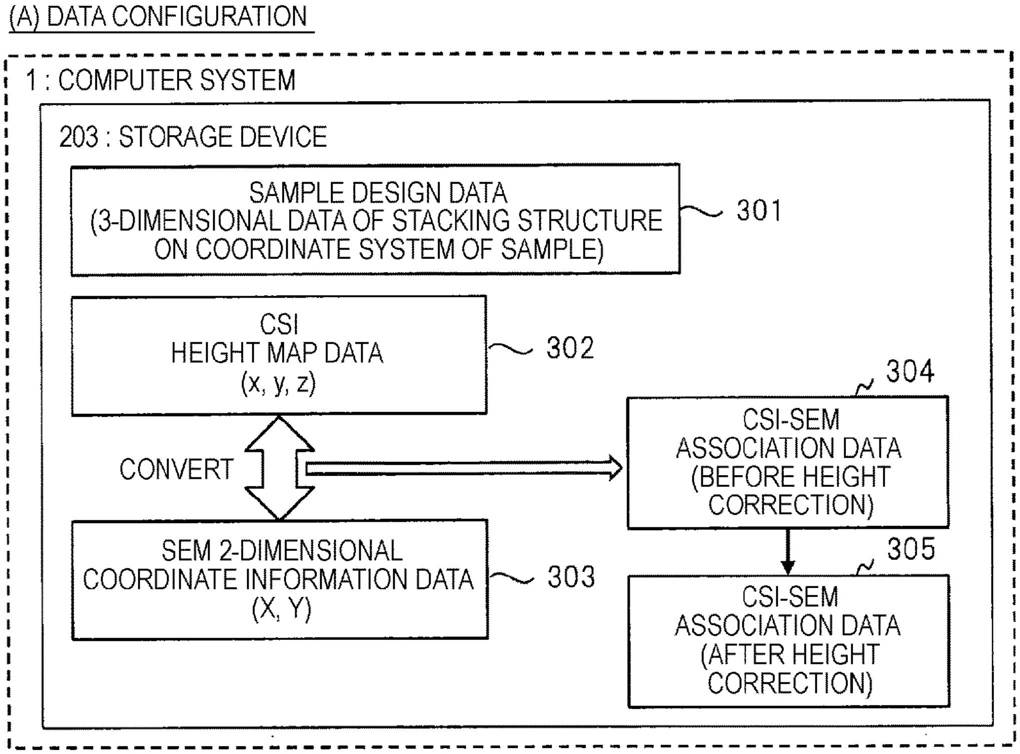
[FIG. 4]
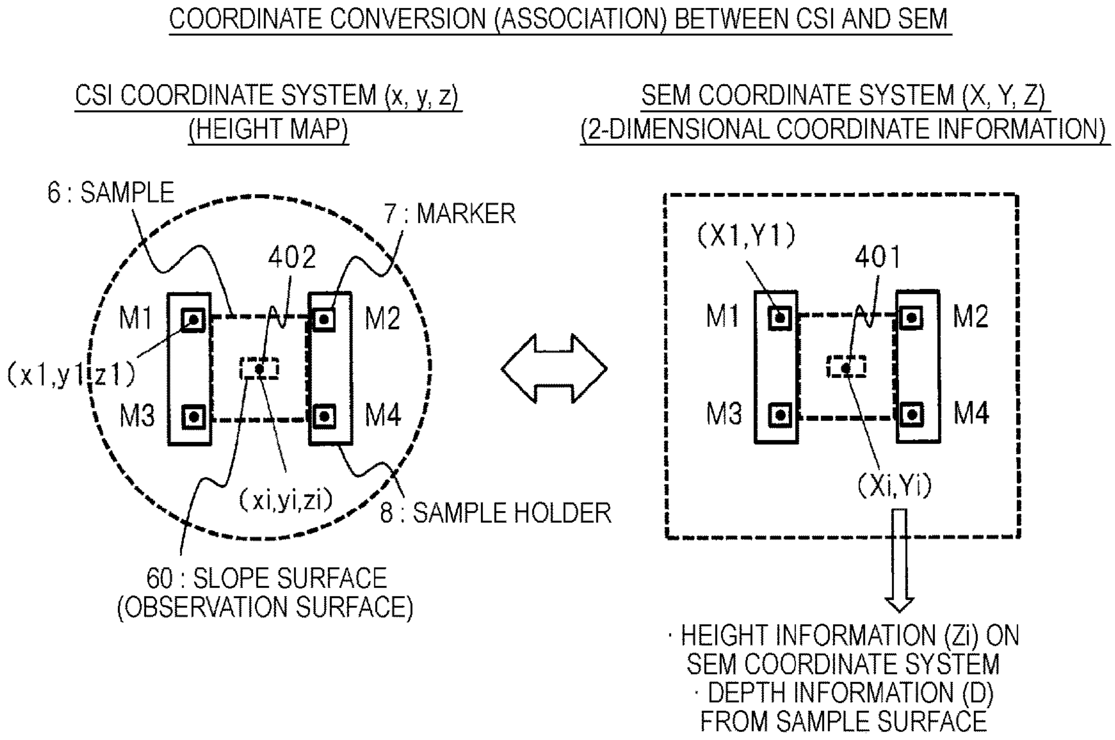

[FIG. 7]
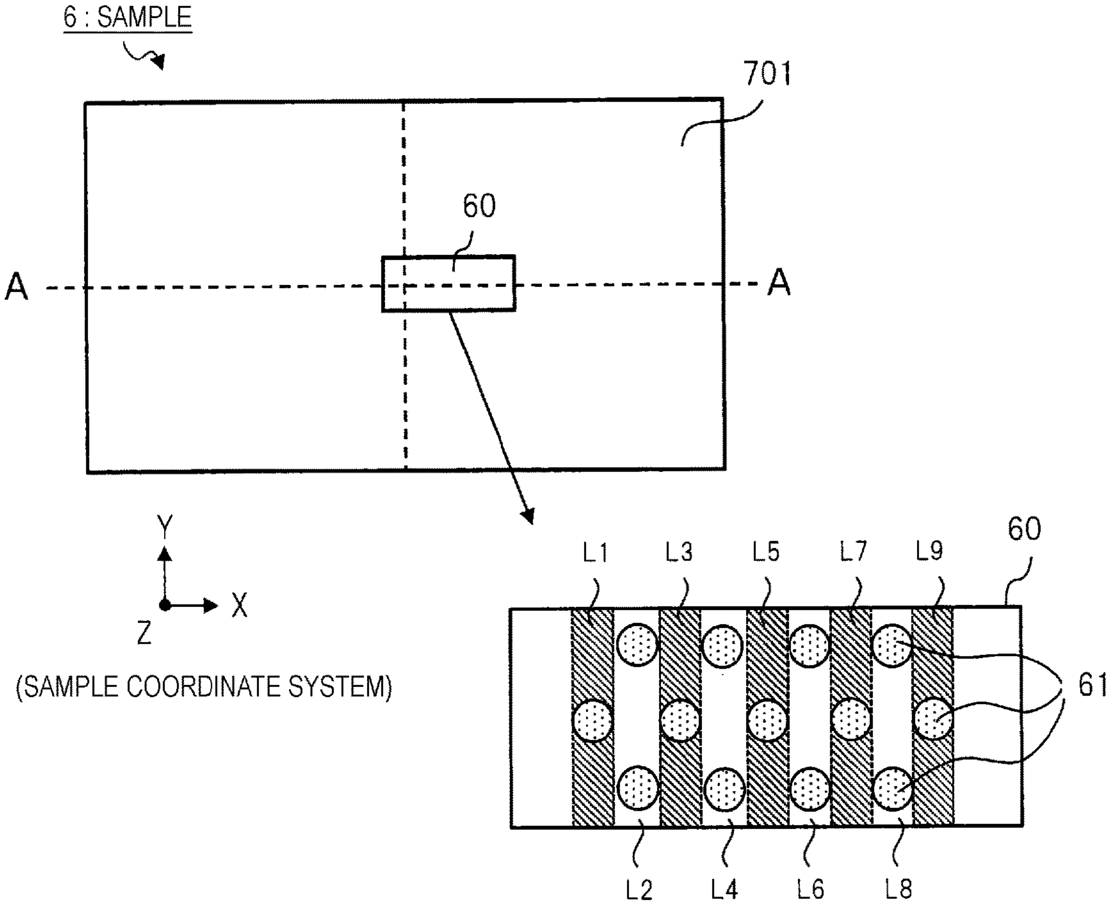
[FIG. 8]
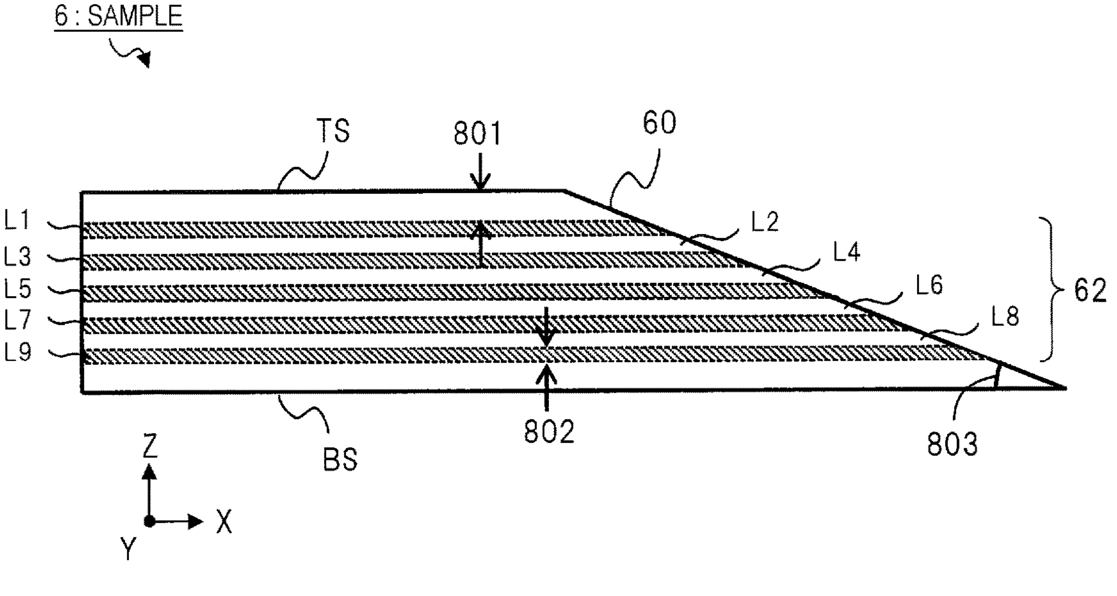

[FIG. 9]
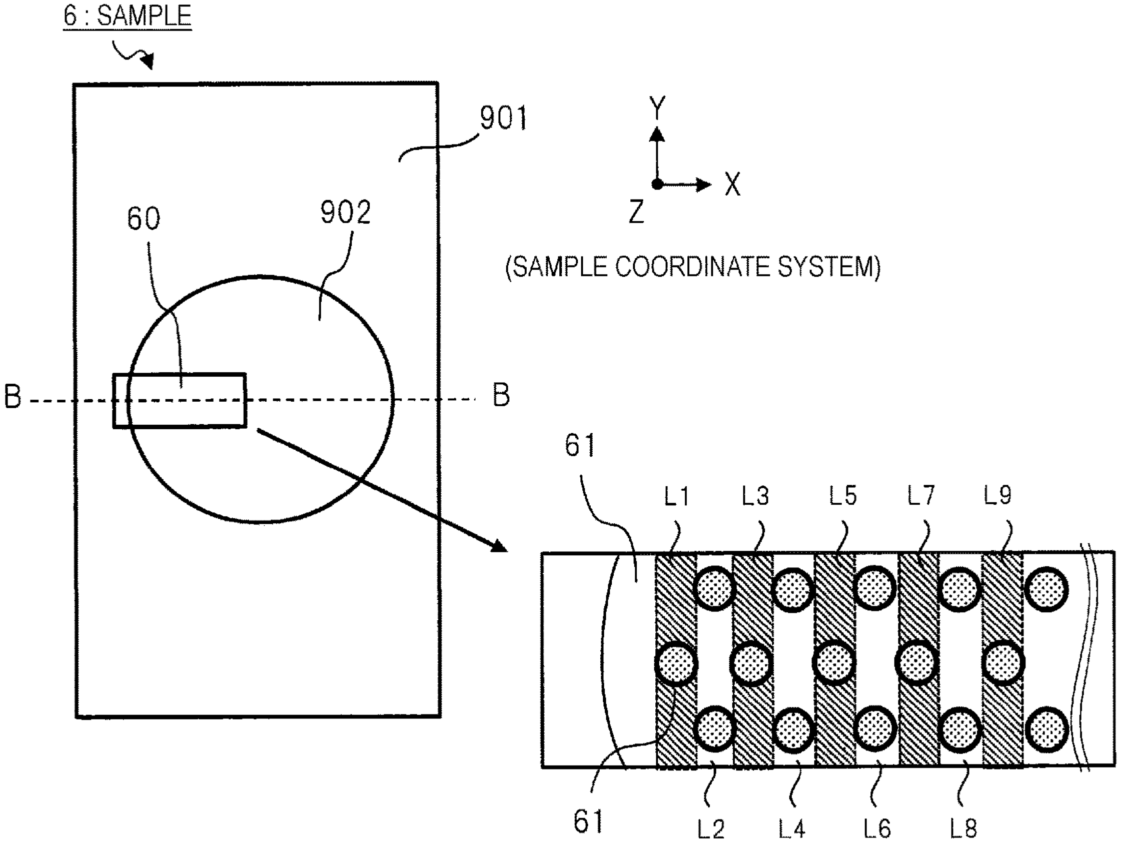
[FIG. 10]
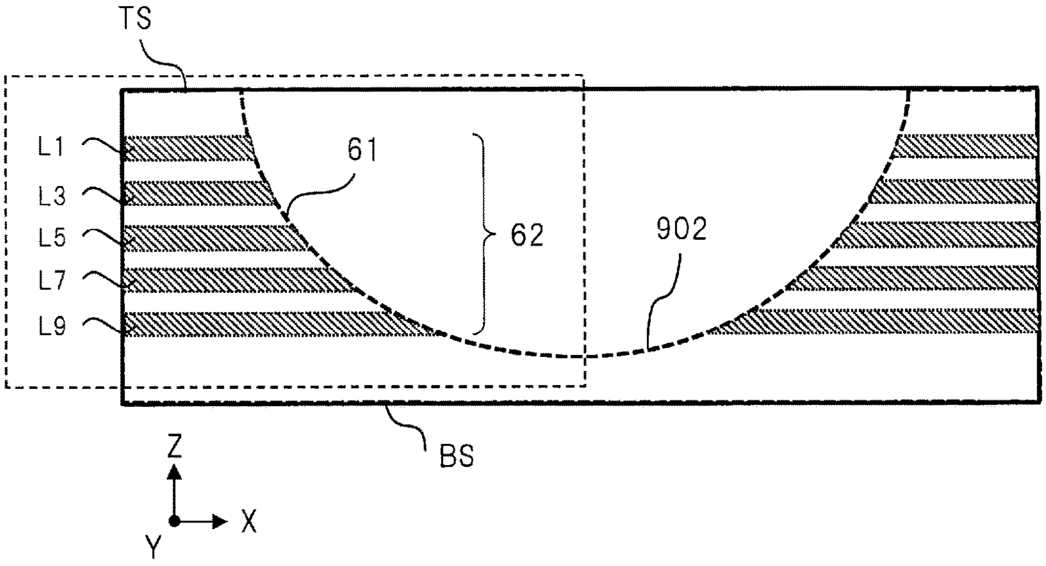

[FIG. 11]
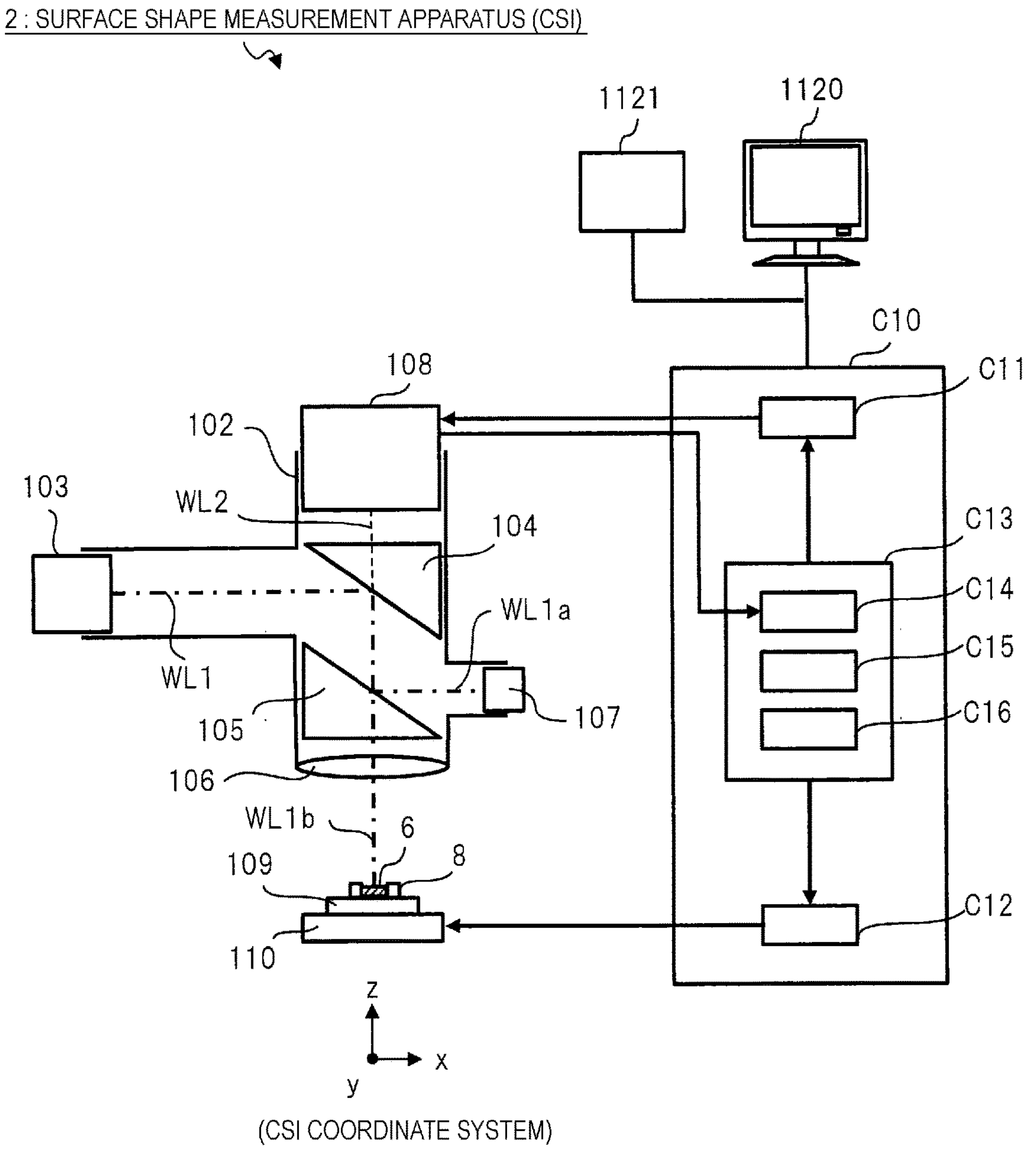

[FIG. 12]

1201 : 3-DIMENSIONAL COORDINATE INFORMATION (HEIGHT MAP)

| | | x | | | | | | |
| --- | --- | --- | --- | --- | --- | --- | --- | --- |
| | | 1 | 2 | 3 | 4 | 5 | 6 | … |
| y | 1 | ○○ | △△ | | | | | |
| | 2 | ×× | | | | | | |
| | 3 | | | | | | | |
| | 4 | | | | | | | |
| | … | | | | | | | |

[FIG. 13]
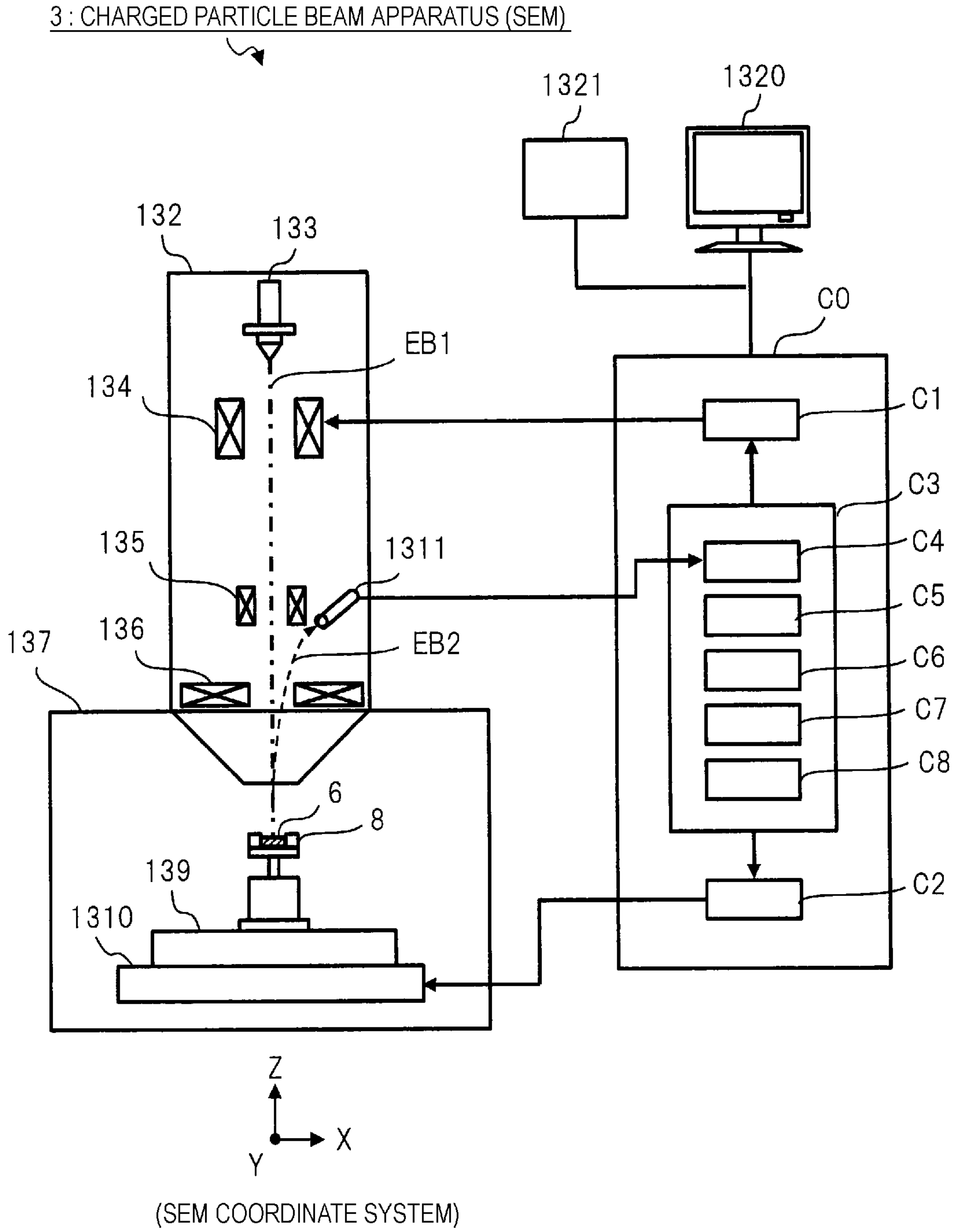

[FIG. 14]
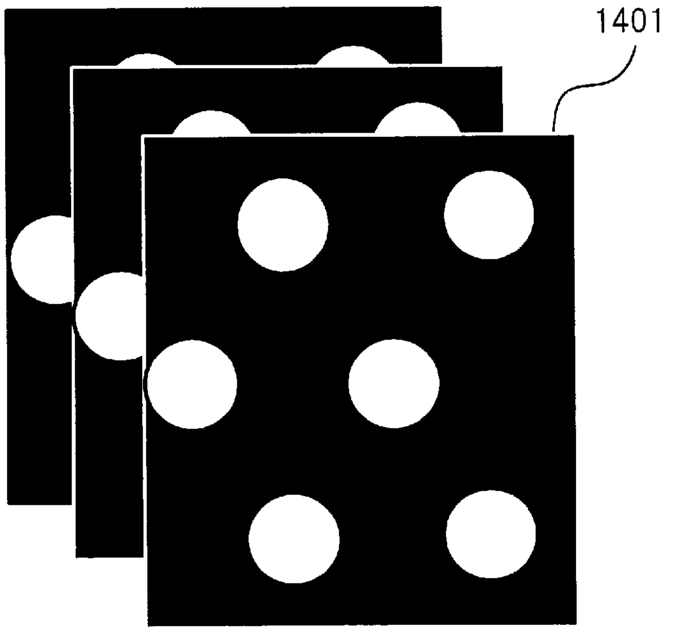
1402 : 2-DIMENSIONAL COORDINATE INFORMATION
| | X | Y |
|---|---|---|
| 1 | ··· | ··· |
| 2 | ··· | ··· |
| 3 | ··· | ··· |
| 4 | ··· | ··· |

[FIG. 15]
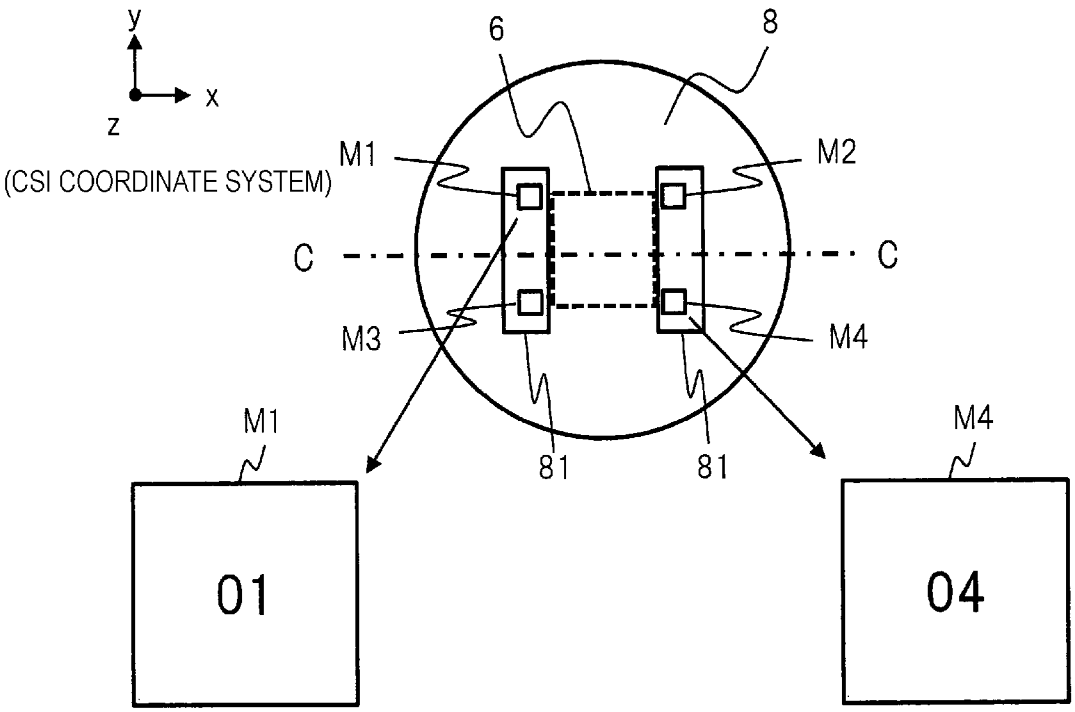
[FIG. 16]
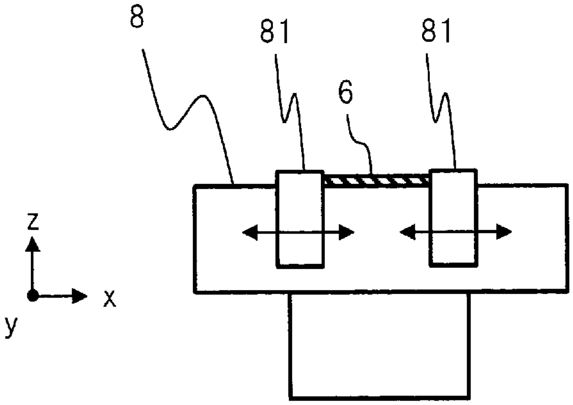

[FIG. 17]
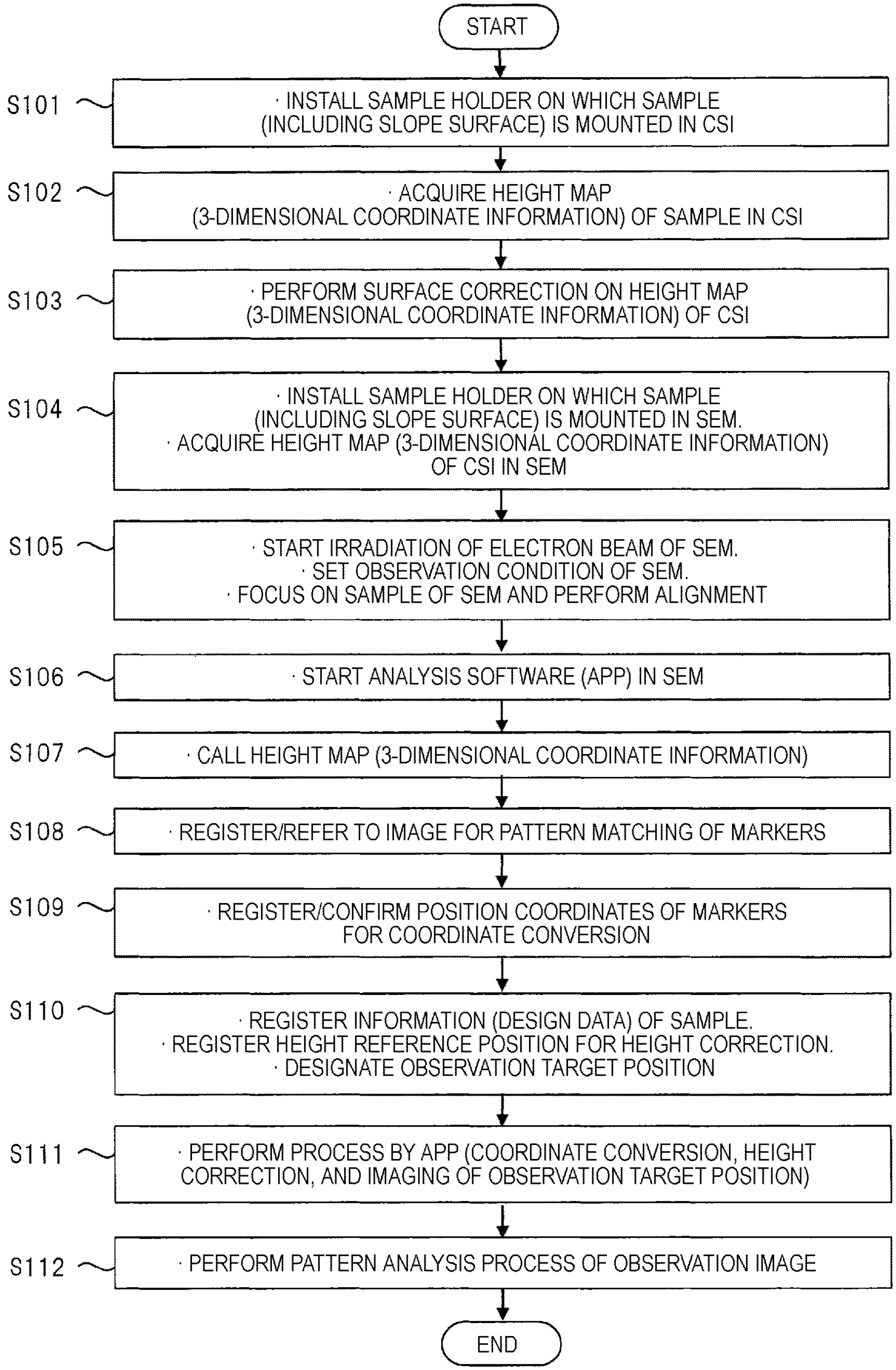

[FIG. 18]
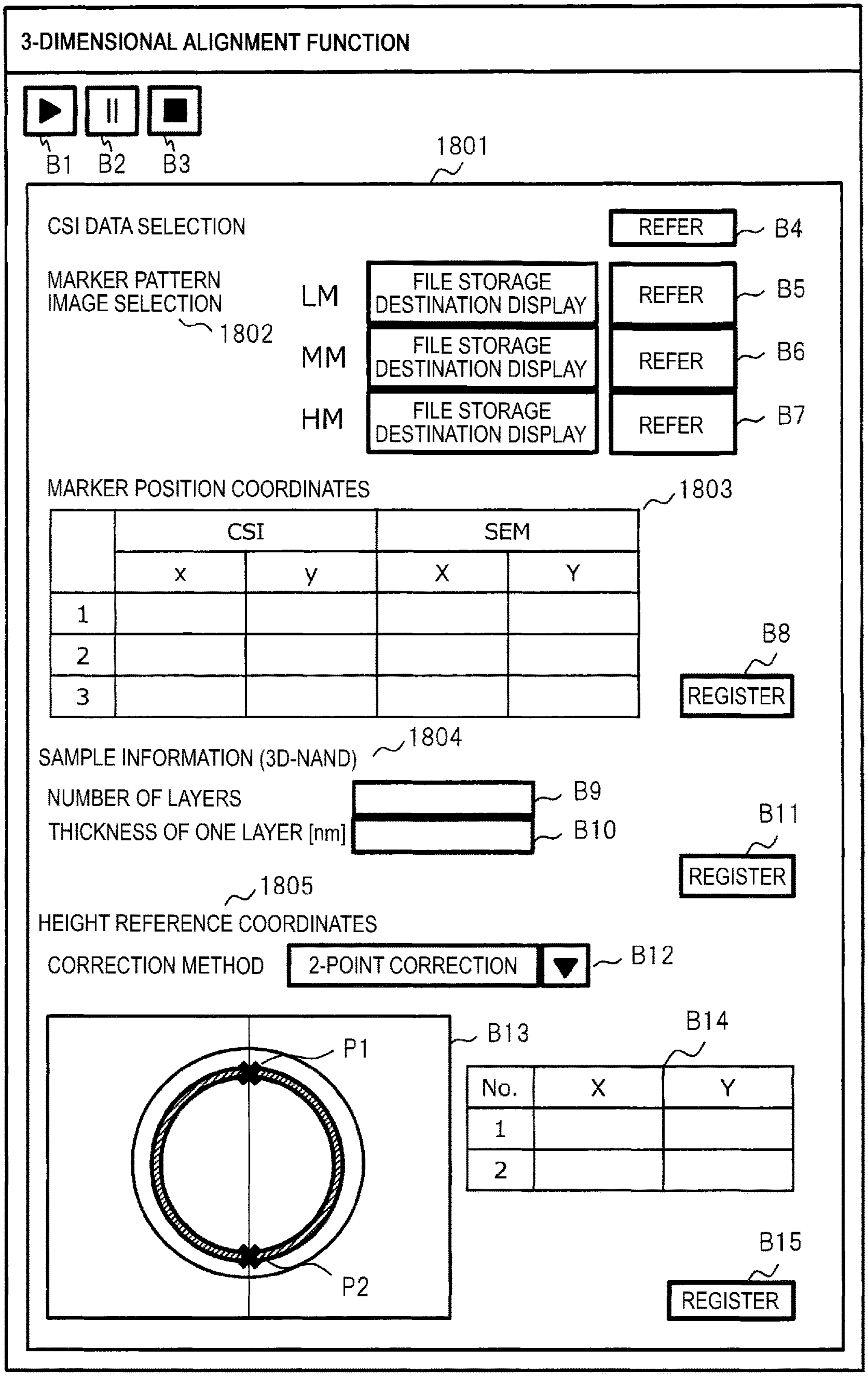

[FIG. 19]
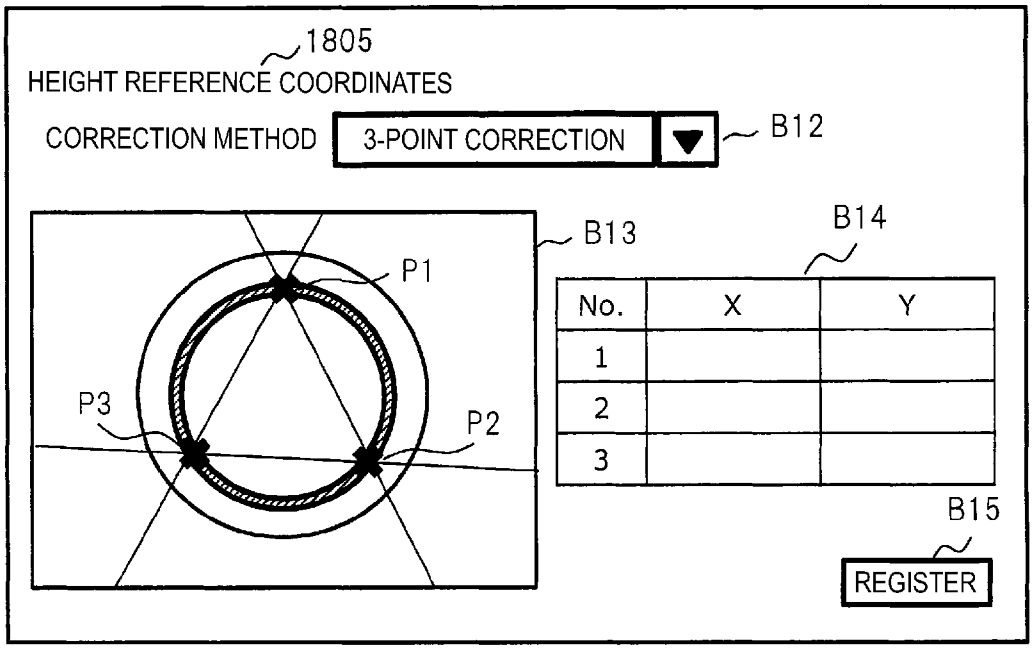

[FIG. 20]
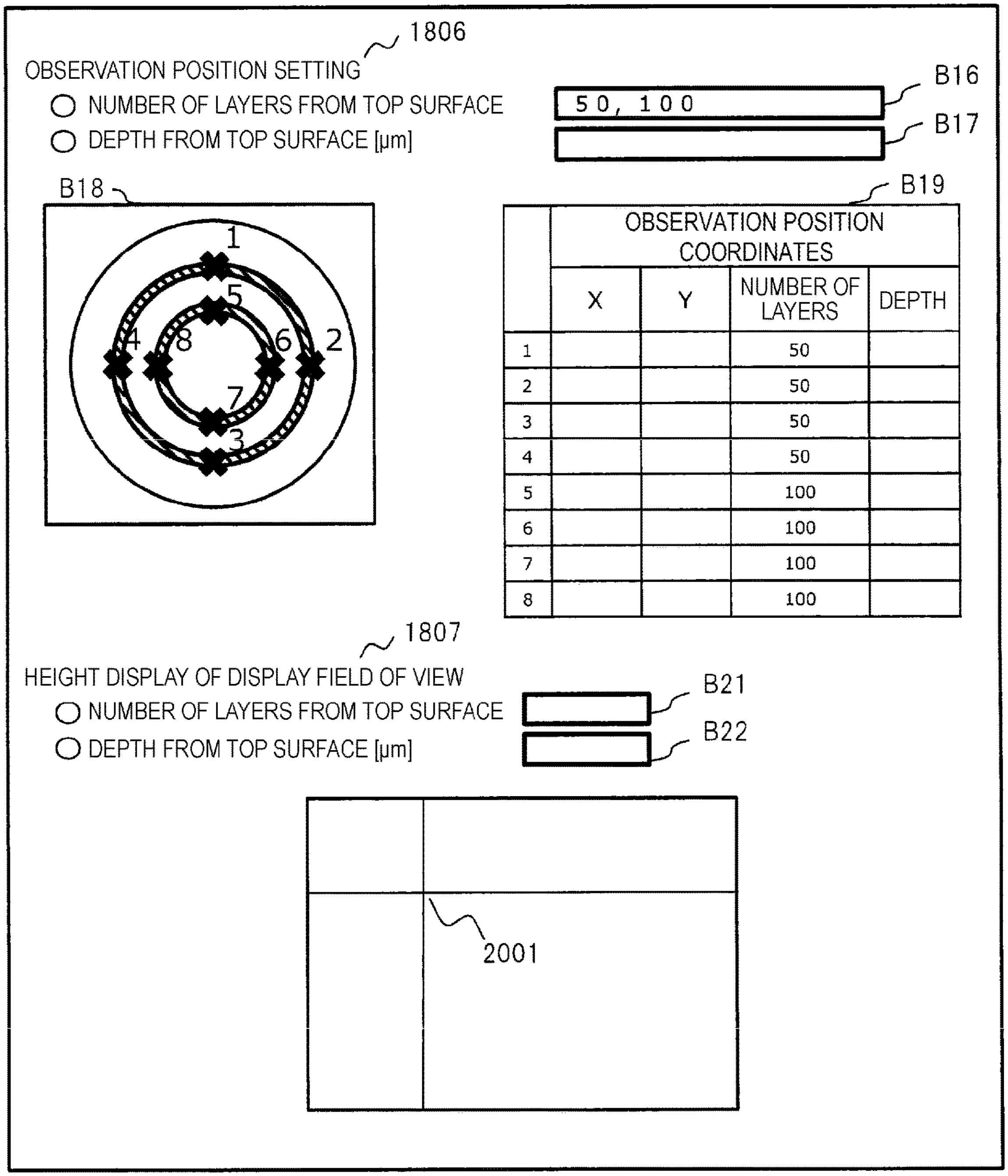

[FIG. 21]
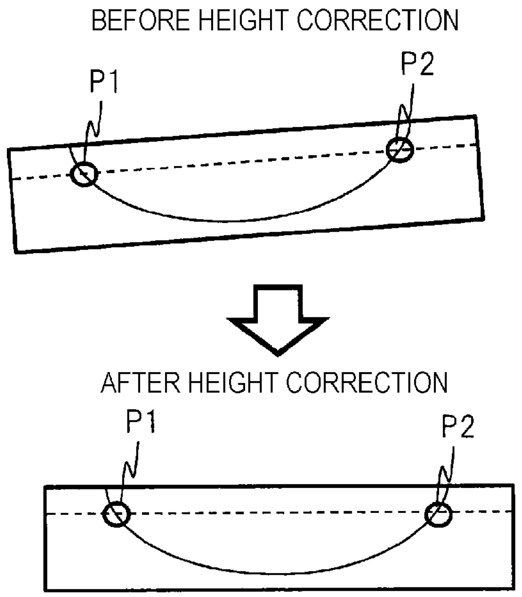
[FIG. 22]
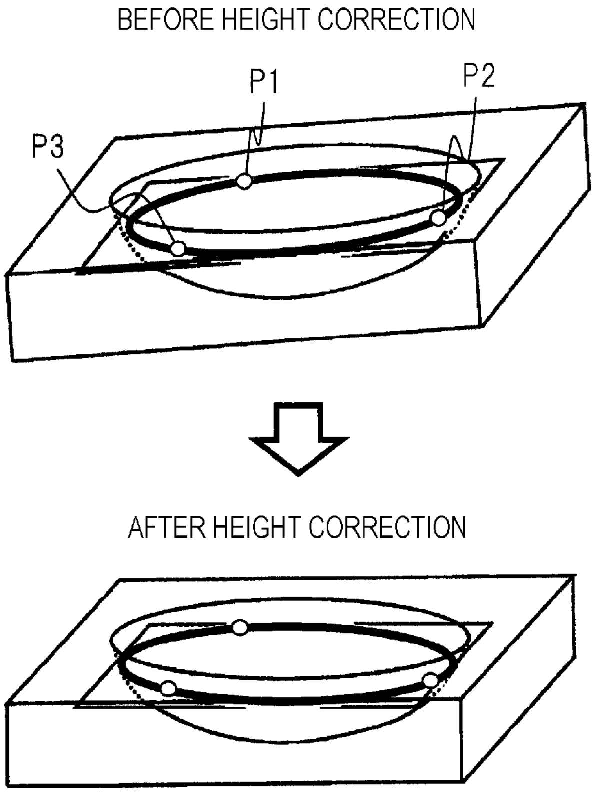

[FIG. 23]

| No. | FILE (OBSERVATION IMAGE) | COORDINATES | | DEPTH OF SAMPLE TOP SURFACE (D) | NUMBER OF LAYERS FROM SAMPLE TOP SURFACE (L) | PATTERN ANALYSIS FILE |
|---|---|---|---|---|---|---|
| | | X | Y | | | |
| 1 | | | | | | |
| 2 | | | | | | |
| 3 | | | | | | |
| 4 | | | | | | |

[FIG. 24]
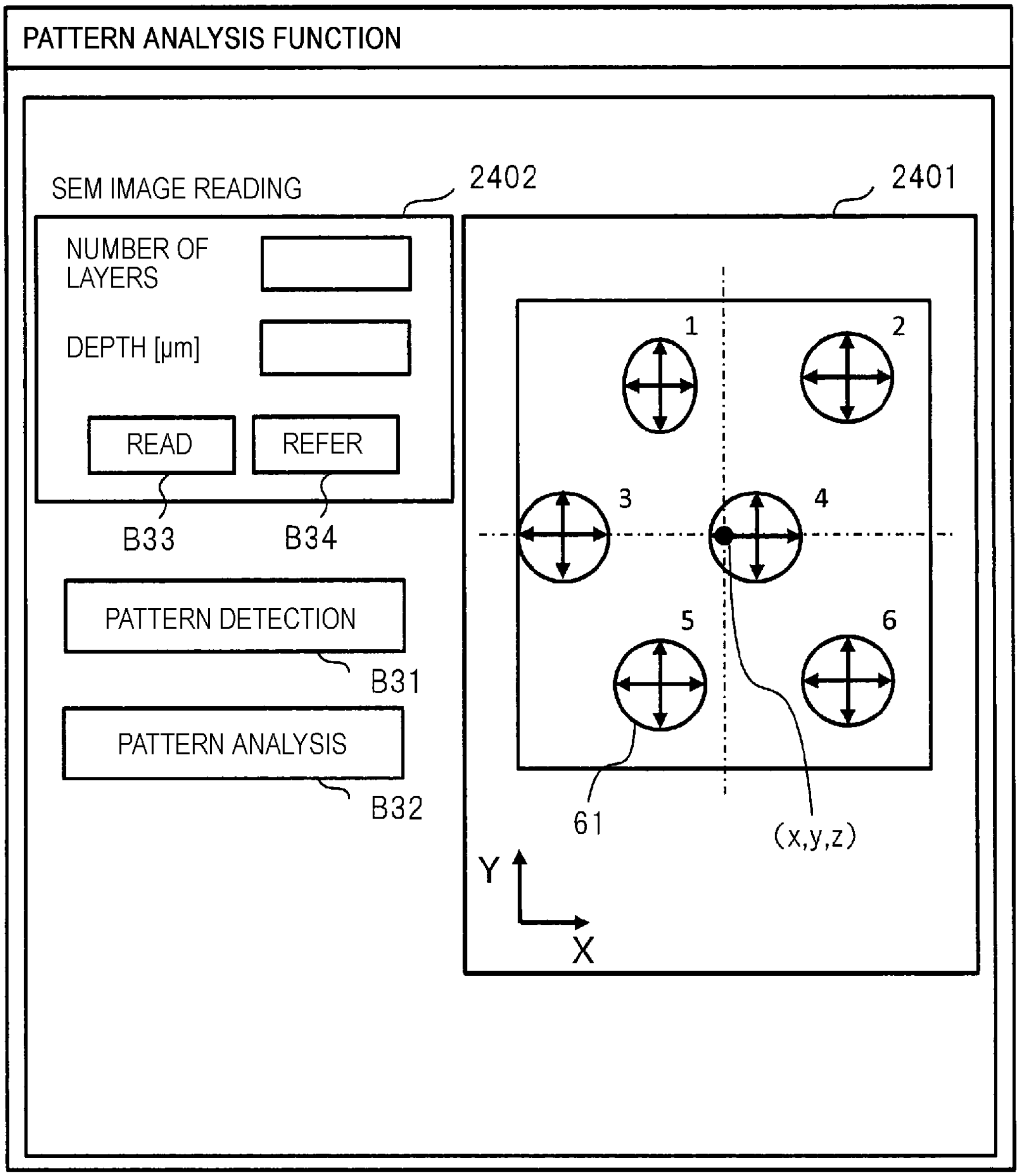

[FIG. 25]

PATTERN INFORMATION (RECORDING TABLE)

| PATTERN NO. | PATTERN MAJOR-AXIS DIAMETER | PATTERN MINOR-AXIS DIAMETER | PATTERN AVERAGE DIAMETER | PATTERN ROUNDNESS |
|---|---|---|---|---|
| 1 | | | | LOW |
| 2 | | | | HIGH |
| 3 | | | | HIGH |
| 4 | | | | HIGH |
| 5 | | | | HIGH |
| 6 | | | | HIGH |

[FIG. 26]
RESULT DISPLAY
OBSERVATION POSITION SETTING
○ NUMBER OF LAYERS FROM TOP SURFACE [50, 100]
○ DEPTH FROM TOP SURFACE [μm] [ ]
2601 2602 2603
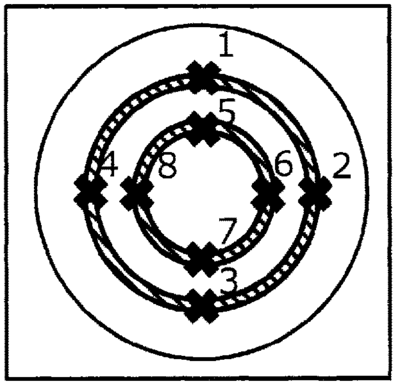
| | OBSERVATION POSITION COORDINATES | | | | ANALYSIS RESULT |
|---|---|---|---|---|---|
| | X | Y | NUMBER OF LAYERS | DEPTH | FILE |
| 1 | | | 50 | | |
| 2 | | | 50 | | |
| 3 | | | 50 | | |
| 4 | | | 50 | | |
| 5 | | | 100 | | |
| 6 | | | 100 | | |
| 7 | | | 100 | | |
| 8 | | | 100 | | |
2604
OBSERVATION IMAGE
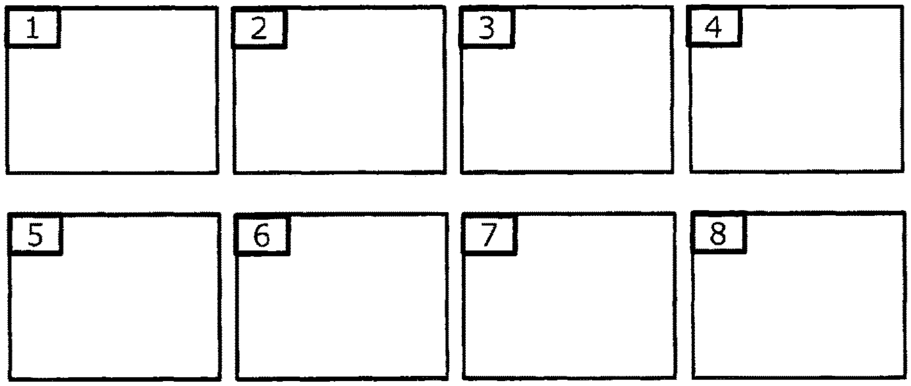

ANALYSIS SYSTEM

TECHNICAL FIELD

The present invention relates to a technology for an analysis system that analyzes a sample.

BACKGROUND ART

Semiconductor devices have been miniaturized. In particular, in semiconductor devices with 3-dimensional structures, high density and large capacity have been significantly advanced in combination of stacking technologies, and multi-layers of stacking structures have been advanced. To manage dimensions of multi-layered pattern structures, it is necessary to evaluate the performance of patterns in each layer. In order to improve quality of semiconductor devices, formation of vertical and uniform patterns is indispensable and quick and highly accurate evaluation of pattern shapes is required.

As a present evaluation scheme, there is a scheme of obtaining depth information of patterns by observing a sample while shaping the sample by a focused ion beam (FIB). In addition, there is a scheme of obtaining depth information of a pattern by observing a sample produced by mechanical polishing in a charged particle beam apparatus and predicting a slope angle of a polished surface.

For example, WO2016/002341A (PTL 1) discloses a technology for processing a sample into a tapered shape using an FIB, acquiring a top surface observation image of a formed slope surface using an electron microscope, and calculating a depth of a pattern based on a start position of a downward slope surface, a scanning distance of an electron beam, and a slope angle.

JP2010-97768A (PTL 2) discloses a technology for using a measurement optical system capable of obtaining depth information in combination with a charged particle beam apparatus, although an application target is not a semiconductor device and the measurement optical system is not a means for obtaining depth information.

CITATION LIST

Patent Literature

PTL 1: WO2016/002341A
PTL 2: JP2010-97768A

SUMMARY OF INVENTION

Technical Problem

A means for using an FIB can perform highly accurate evaluation on a pattern, but there are problems that a processing region is narrow, it takes a time to perform evaluation, and it is difficult to acquire data again. A means for predicting a slope angle of a polished surface can perform rapid evaluation, but there is a problem that accuracy of an evaluation value of a pattern is low since depth information of the pattern cannot be calculated except for prediction. Further, the means for using an FIB also has a problem that an observation throughput is lowered due to multi-layers of a future stacking structure since the number of layers needs to be identified one by one.

A technology capable of acquiring depth information of a multi-layered structure of a sample quickly and accurately without using an FIB is required.

An object of the present invention is to provide a technology capable of acquiring depth information of a sample quickly and accurately with regard to a technology of an analysis system.

Solution to Problem

A representative embodiment of the present invention has the following configuration. An analysis system according to an embodiment is an analysis system including a computer system. The computer system acquires 3-dimensional coordinate information of a top surface shape of a sample having a stacking structure, the 3-dimensional coordinate information being measured by a top surface shape measurement apparatus, acquires 2-dimensional coordinate information based on a photographic image of the sample imaged by a charged particle beam apparatus, performs coordinate conversion for association between the 3-dimensional coordinate information of the top surface shape measurement apparatus and the 2-dimensional coordinate information of the charged particle beam apparatus and acquires association data which is a result, and acquires depth information on a coordinate system of the charged particle beam apparatus based on the association data.

Advantageous Effects of Invention

According to a representative embodiment of the present invention, it is possible to acquire depth information of a sample quickly and accurately with regard to a technology of an analysis system. The other problems, configurations, effects, and the like will be clarified in forms for carrying out the invention.

BRIEF DESCRIPTION OF DRAWINGS

FIG. 1 is a diagram illustrating an overall configuration of an analysis system according to an embodiment.

FIG. 2 is a flowchart illustrating a main processing flow of the analysis system according to the embodiment.

FIG. 3 is a diagram illustrating a data configuration example of the analysis system according to the embodiment.

FIG. 4 is a diagram illustrating coordinate conversion and association between a CSI and an SEM in the analysis system according to the embodiment.

FIG. 7 is a diagram illustrating a configuration example of a sample in a plan view when a slope surface is a flat surface in the analysis system according to a first embodiment.

FIG. 8 is a diagram illustrating a configuration example of a cross-section of the sample when the slope surface is a flat surface in the analysis system according to the first embodiment.

FIG. 9 is a diagram illustrating a configuration example of the sample in a plan view when the slope surface is a curved surface in the analysis system according to the first embodiment.

FIG. 10 is a diagram illustrating a configuration example of a cross-section of the sample when the slope surface is a curved surface in the analysis system according to the first embodiment.

FIG. 11 is a diagram illustrating a configuration example of a top surface shape measurement apparatus (CSI) in the analysis system according to the first embodiment.

FIG. 12 is a diagram illustrating a configuration example of 3-dimensional coordinate information of the CSI in the analysis system according to the first embodiment.

FIG. 13 is a diagram illustrating a configuration example of a charged particle beam apparatus (SEM) in the analysis system according to the first embodiment.

FIG. 14 is a diagram illustrating a configuration example of a photographic image and 2-dimensional coordinate information of the SEM in the analysis system according to the first embodiment.

FIG. 15 is a plan view illustrating a configuration example of a sample holder, a marker, and the like in the analysis system according to the first embodiment.

FIG. 16 is a sectional view illustrating a configuration example of the sample holder, the marker, and the like in the analysis system according to the first embodiment.

FIG. 17 is a flowchart illustrating a main processing flow in the analysis system according to the first embodiment.

FIG. 18 is a diagram illustrating part 1 of a configuration example of an operational screen in the analysis system according to the first embodiment.

FIG. 19 is a diagram illustrating part 2 of the configuration example of the operational screen in the analysis system according to the first embodiment.

FIG. 20 is a diagram illustrating part 3 of the configuration example of the operational screen in the analysis system according to the first embodiment.

FIG. 21 is a diagram illustrating an example (2-points correction) of height correction in the analysis system according to the first embodiment.

FIG. 22 is a diagram illustrating an example (3-points correction) of height correction in the analysis system according to the first embodiment.

FIG. 23 is a diagram illustrating a configuration example of a recording table in the analysis system according to the first embodiment.

FIG. 24 is a diagram illustrating a screen example at an analysis time in the analysis system according to the first embodiment.

FIG. 25 is a diagram illustrating a screen example (pattern information) at an analysis time in the analysis system according to the first embodiment.

FIG. 26 is a diagram illustrating a screen example of an analysis result display in the analysis system according to the first embodiment.

DESCRIPTION OF EMBODIMENTS

Figure 5A:
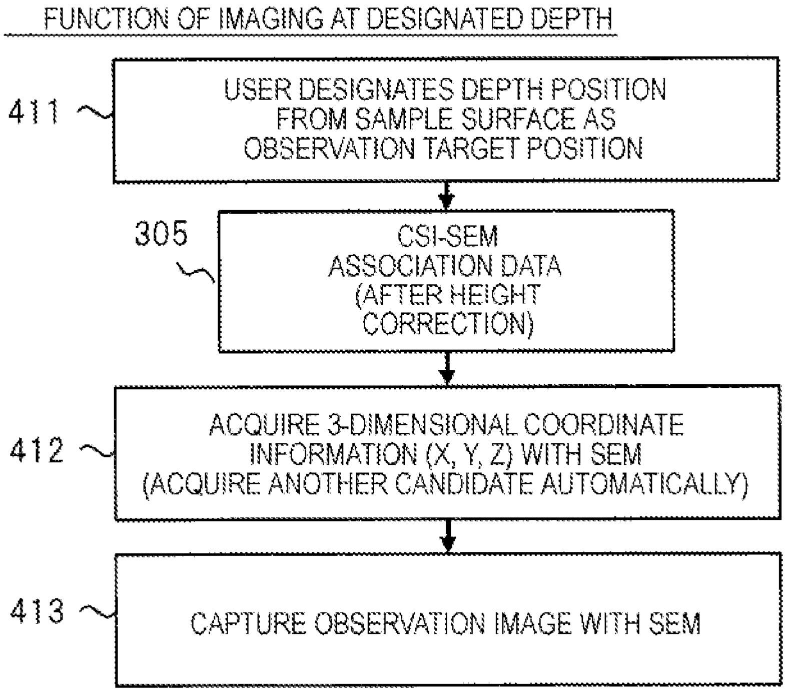
FIGS. 5A and 5B are diagrams illustrating an outline of a function of performing imaging at a designated depth and a function of calculating a depth of a designated portion in the analysis system according to the embodiment.

Hereinafter, embodiments of the present invention will be described in detail with reference to the drawings. In the drawings, the same reference numerals are given to the same units in principle and repeated description thereof will be omitted. In the drawings, to facilitate understanding of the present invention, actual positions, sizes, shapes, ranges, or the like are not represented in expressions of constituent elements in some cases.

In description of a process by a program, a program, a function, a processing unit, or the like serves as a main entity in some cases. A main hardware entity for the program, the function, the processing unit, or the like is a processor or a controller, an apparatus, a computer, a system, or the like including the processor or the like. The computer performs a process as a processor in accordance with a program read on a memory while appropriately using resources such as a memory, a communication interface, and the like. Accordingly, a predetermined function, a processing unit, or the like is implemented. The processor is configured as a semiconductor device or the like such as a CPU or a GPU. The processor is configured as a device or a circuit capable of performing predetermined calculation. A process is not limited to software program processing and can also be mounted on a dedicated circuit. As the dedicated circuit, an FPGA, an ASIC, a CPLD, or the like can be applied.

The program may be installed in advance as data in a target computer or may be distributed to be installed as data from a program source to a target computer. The program source may be a program distribution server on a communication network or may be a non-transitory computer-readable storage medium (for example, a memory card or a magnetic disk). The program may include a plurality of modules. A computer system may include a plurality of apparatuses. The computer system may be configured as a cloud computing system or the like.

Various types of data or information have structures such as a table or a list, but the present invention is not limited thereto. An expression such as identification information, an identifier, an ID, a name, a number can be substituted. In description, X, Y, and Z directions or the like are used in some cases. These directions (in other words, axes) intersect each other and are particularly orthogonal to each other. In particular, the Z direction is assumed to be a direction corresponding to top and bottom, a height, a depth, a thickness, or the like.

Analysis System According to Embodiment

An analysis system according to an embodiment is a system capable of acquiring depth information of a multi-layered structure included in a sample. The analysis system according to the embodiment includes a computer system that includes a processor. The analysis system includes hardware and software executing the following steps. In other words, an analysis method corresponding to the analysis system is a method in which the computer system or the like executes the following steps.

(a) A step of processing a top surface of a sample such as a semiconductor device having a multi-layered structure (in other words, a stacking structure) to, for example, a bowl or tapered shape using a polishing technology such as a dimple grinder or an ion milling and forming a slope surface serving as an observation surface.

(b) A step of acquiring, as a height map, 3-dimensional coordinate information of a top surface shape of the sample viewed in a top surface direction by irradiating a sample top surface having a slope surface with light in the top surface direction using a top surface shape measurement apparatus such as an optical interference microscope (CSI).

(c) A step of observing/imaging the sample in a charged particle beam apparatus such as a scanning electron microscope (SEM) and acquiring 2-dimensional coordinate information based on particles (in other words, a photographic image) such as a detected secondary electron or reflected electron image.

(d) A step in which the computer system acquires the 3-dimensional coordinate information of the top surface shape measurement apparatus and the 2-dimensional coordinate information of the charged particle beam apparatus.

(e) A step in which the computer system performs coordinate conversion for association between the 3-dimensional coordinate information of the top surface shape measurement apparatus and the 2-dimensional coordinate information of the charged particle beam apparatus and generates association data. The coordinate conversion is performed by a projective conversion method using, for example, markers. In the association data, height depth information in the top surface shape measurement apparatus is associated with the 2-dimensional coordinate information of a stage coordinate system in the charged particle beam apparatus.

(f) A step in which the computer system on the charged particle beam apparatus corrects a height in consideration of a slight slope or the like of a sample occurring when the height map is acquired in the foregoing (b) with respect to the height map acquired in the foregoing (d).

(g) A step in which a user designates an observation target position of the sample by using a depth or the like from the sample top surface on a graphical user interface (GUI) screen provided by the computer system.

(h) A step of performing movement to the observation target position corresponding to the depth or the like designated on 3-dimensional coordinate information of the association data in the charged particle beam apparatus based on the designation of the observation target position, focusing a charged particle beam using an objective lens, and capturing an observation image.

[Analysis System]

FIG. 1 is a diagram illustrating an overall configuration of an analysis system according to an embodiment. The analysis system in FIG. 1 includes a computer system 1 (corresponding to a main unit of the analysis system), a top surface shape measurement apparatus 2 (in particular, a CSI), a charged particle beam apparatus 3 (in particular, an SEM), a polishing apparatus 4, and a manufacturing execution system (an MES) 5. These constituent elements are connected to each other via a communication network such as a LAN 9. Even when the constituent elements are not connected to each other in communication, data information may be input and output between the constituent elements, for example, by allowing a user to store the data information in a storage medium such as a memory card and to carry the storage medium.

The computer system 1 includes a processor 201, a memory 202, a storage device 203, a communication interface 204, and an input/output interface 205, which are connected to each other via a bus. The storage device 203 stores various types of data or programs. The programs include analysis software 210 to be described below. A display device 206 or an input device 207 are connected to the input/output interface 205. The communication interface 204 is connected to the LAN 9. An external device such as MES 5 stores design data or the like of the sample.

[Processing Flow]

FIG. 2 is a flowchart illustrating a main processing flow (including work by the user) of the analysis system according to the embodiment. The flowchart includes steps S1 to S7.

In step S1, the user produces a slope surface (a surface in which a stacking structure is exposed) in a part of the top surface of a sample (for example, a 3-dimensional NAND device) with the polishing apparatus 4. The user may acquire design data of the sample with the computer system 1 from the MES 5 or the like. The design data is data including 3-dimensional data of the stacking structure in a coordinate system of the sample.

In step S2, the user sets markers for the coordinate conversion on the sample. In a specific example, markers of four points are formed in advance on a sample holder holding the sample so as to be commonly used in the CSI and the SEM. The present invention is not limited thereto. For example, when there is a pattern of three points or more which are distinguishable and identifiable on the sample top surface (near a slope surface), the points may be used as markers. The markers may be formed on the sample top surface by the polishing apparatus 4 or another apparatus.

The user sets the sample to which the markers are attached in the top surface shape measurement apparatus (CSI), and measures and acquires a height map (3-dimensional coordinate information) by the CSI with an entire region of the slope surface of the sample as a target. The height map also includes 3-dimensional coordinate information of the markers. The computer system 1 acquires the height map (3-dimensional coordinate information).

On the CSI side, accuracy of data may be improved by further performing surface correction to be described below.

In step S3, the user sets the sample to which the markers are attached in the charged particle beam apparatus (SEM) and images or displays 2-dimensional coordinate information (in other words, an image) with the SEM. The computer system 1 acquires the 2-dimensional coordinate information.

In step S4, the user performs a coordinate conversion process from the height map (3-dimensional coordinate information) of the CSI to the 2-dimensional coordinate information of the SEM with the computer system 1 (the analysis software 210). The coordinate conversion process is implemented by a projective conversion method using the position coordinate information of the markers of four points. The computer system 1 acquires the association data of CSI-SEM which is a result of the coordinate conversion.

In step S5, the computer system 1 further performs a height correction process on the association data. The height correction is correction in which a slight slope or the like of the sample occurring when the height map is acquired with the CSI is considered. The height correction process is correction performed so that a reference height position is the same height based on the reference height position (which can be designated, for example, by the user on a GUI screen). The computer system 1 acquires association data after the height correction as a result of the height correction process.

In step S6, the user designates an observation target position by using a depth or the like from the top surface of the sample based on the association data after the height correction on the GUI screen of the computer system 1.

In step S7, the computer system 1 controls an imaging condition or the like of the SEM based on the observation target position designated by the user, causes the SEM to capture an observation image, and displays the observation image on the GUI screen. The computer system 1 analyzes the observation image and displays analysis result information on the GUI screen.

[Data of Analysis System]

FIG. 3 is a diagram illustrating a configuration example of data stored and retained in the storage device 203 or the like of the computer system 1 of the analysis system. Data of (A) of FIG. 3 includes sample design data 301, CSI height map data 302, SEM 2-dimensional coordinate information data 303, association data 304 before the height correction, and association data 305 after the height correction. The CSI height map data 302 and the SEM 2-dimensional coordinate information data 303 are associated through the coordinate conversion (step S4 of FIG. 2) to produce the association data 304 before the height correction. From the association data 304 before the height correction, the association data 305 after the height correction is produced through the height correction (step S5 of FIG. 2). The association data may be a conversion formula for the coordinate conversion or may be table data such as a lookup table.

[Coordinate Conversion]

FIG. 4 illustrates a projective conversion method using, particularly, markers of four points in coordinate conversion and association between the CSI and the SEM. On a CSI coordinate system (x, y, z), the height map (3-dimensional coordinate information) is measured on the top surface of the sample 6 including a slope surface 60 (in other words, an observation surface). On the same CSI coordinate system, the 3-dimensional coordinate information of the CSI of the markers 7 of four points on a stage coordinate system is acquired in association with the outer side in the height map in which only the sample 6 is imaged. Alternatively, 3-dimensional coordinate information of the top surface of the sample and 3-dimensional coordinate information of positions (indicated as block points) of the markers 7 (M1, M2, M3, and M4) of four points are both included and acquired in the height map. For example, the 3-dimensional coordinates of the marker 1 are (x1, y1, z1). In the height map of the CSI, height information (z) is expressed in color. The 3-dimensional coordinate information may not be acquired without including the markers. In this case, coordinates of xy positions of the marker are separately acquired.

On an SEM coordinate system (X, Y, Z), 2-dimensional coordinate information (X, Y) is acquired. The 2-dimensional coordinate information includes 2-dimensional coordinate information of positions of the markers 7 (M1, M2, M3, M4) of four points. Alternatively, on the same SEM coordinate system, 2-dimensional coordinate information of the markers 7 of four points is acquired in association with the outer side in the 2-dimensional coordinate information of only the sample 6. For example, 2-dimensional coordinates of the marker M1 are (X1, Y1). Pattern matching of the markers 7 is used as a technical means for detecting the positions of the markers 7 from an image (2-dimensional coordinate information) of the SEM.

In the height map (the 3-dimensional coordinate information) (the data 302 of FIG. 3) of the CSI and 2-dimensional coordinate information (the data 303 of FIG. 3) of the SEM, conversion and association are achieved by a projective conversion method using 2-dimensional position coordinate information of the markers 7 of four points. The conversion is possible using three points or more. Between the two types of data, the positions of the markers 7 of four points are superimposed to match, and thus a coordinate conversion formula can be produced by projective conversion. Accordingly, a certain position 401 (Xi, Yi) on the slope surface 60 in the 2-dimensional coordinate information of the SEM is associated with a position 402 (xi, yi, zi) in the height map of the CSI based on the association data 305 of FIG. 3. In other words, the position 402 (xi, yi, zi) in the CSI can be referred to from the position 401 (Xi, Yi) in the SEM. Conversely, the position 401 (Xi, Yi) in the SEM can be referred to from the position 402 (xi, yi, zi) in the CSI.

The computer system 1 can obtain height depth information (zi) in the CSI corresponding to the position 401 (Xi, Yi) in the SEM. The height depth information (zi) can be converted into height information (Zi) of the Z axis on the SEM coordinate system by the association or conversion. That is, in the association data 304 or the association data 305, 3-dimensional coordinate information (X, Y, Z) on the SEM coordinate system can be configured.

The height depth information (zi) can be converted into depth information (for example, denoted by reference sign D) from the top surface in the coordinate system (a coordinate system known from the design data 301 or the like) of the sample 6. That is, in the association data 304 or the association data 305, 3-dimensional coordinate information (X, Y, D) on a sample coordinate system associated with the SEM coordinate system can also be configured. In addition, 3-dimensional coordinate information (X, Y, L) in a format in which the number of layers (for example, denoted by reference sign L) is associated with a depth D can also be configured.

[Function of Analysis System]

Figure 5B:
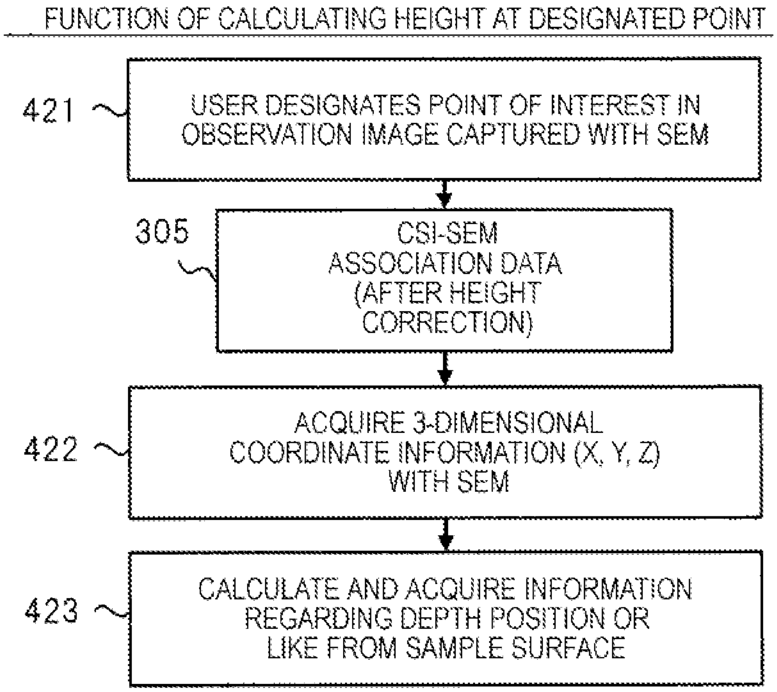
Figure 6A:
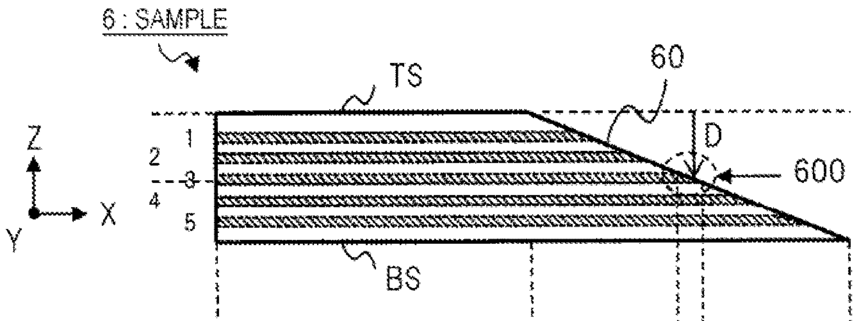
FIGS. 6A to 6D are diagrams illustrating an example in which an observation target position is imaged based on designation of a depth from a top surface of a sample in the analysis system according to the embodiment.
Figure 6B:
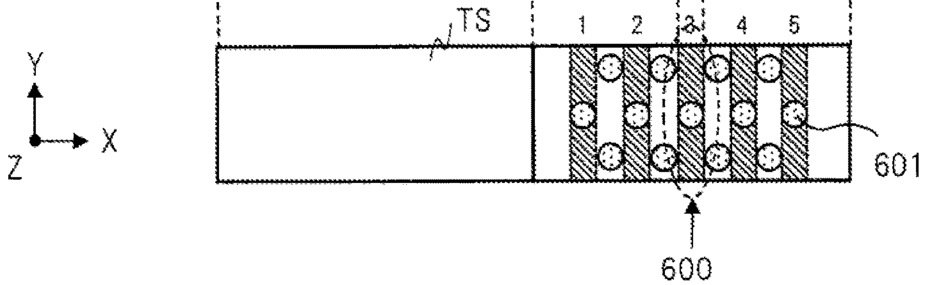
Figure 6C:
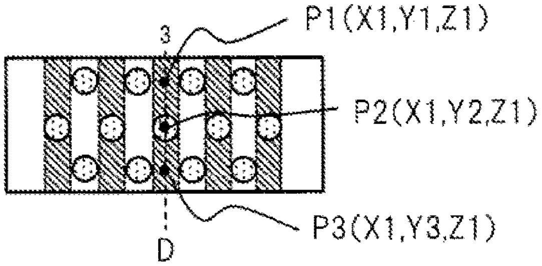
Figure 6D:
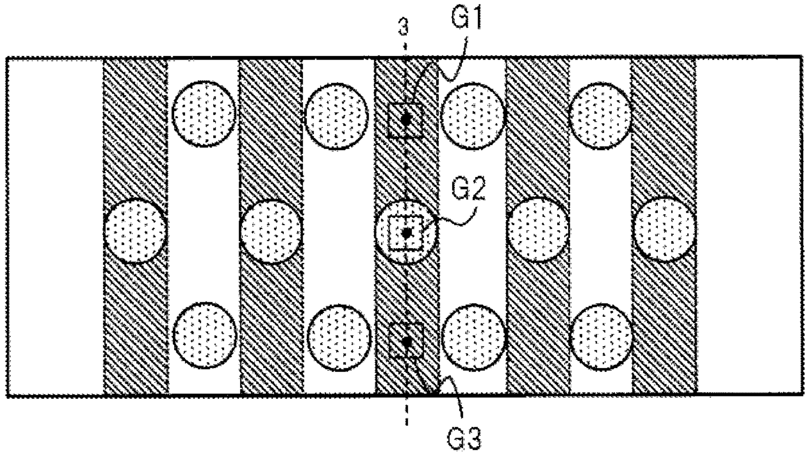

FIG. 5 illustrates an overview of a function (A) of capturing an observation image at a designated height (in other words, a depth) and a function (B) of calculating a height (depth) at a designated point (X, Y) of the observation image as main functions of the computer system 1 of the analysis system.

When the function (A) is used, the user first designates and inputs a depth (or a layer or the like) from the top surface of the sample as an observation target position on the GUI screen of the computer system 1 in step 411. The computer system 1 inputs the designated depth information into the association data 305 of the CSI-SEM. In step 412, the computer system 1 acquires the 3-dimensional coordinate information (X, Y, Z) in the SEM corresponding to the designated depth as an output from the association data 305. The acquired 3-dimensional coordinate information (X, Y, Z) includes another candidate (another position at the same layer and the same height), and one or more 3-dimensional positions can be automatically acquired. In step 413, the computer system 1 controls an imaging condition or the like of the SEM in association with the acquired 3-dimensional position, captures an observation image in the SEM, and displays the observation image on the GUI screen.

When the function (B) is used, the user first views an observation image captured with the SEM on the GUI screen of the computer system 1, designates and inputs 2-dimensional coordinates of a point of interest in the observation image in step 421. The computer system 1 inputs the designated portion (the 2-dimensional coordinates) into the association data 305 of the CSI-SEM. In step 422, the computer system 1 acquires the 3-dimensional coordinate information (X, Y, Z) in the SEM corresponding to the designated point as an output from the association data 305. In step 423, the computer system 1 calculates a depth position or the like from the top surface of the sample by conversion from the acquired 3-dimensional position and displays the depth position on the GUI screen.

[Association]

FIG. 6 is a schematic explanatory diagram illustrating an example of association related to the position coordinate information between the CSI and the SEM or an observation position acquisition based on the depth designation. (A) illustrates an X-Z plane as a cross-section of the slope surface 60 in which the stacking structure of the sample 6 is exposed. Here, a coordinate system in description is a sample coordinate system. A case in which the slope surface 60 by polishing is a flat surface will be described. Here, a case in which the number of layers indicated by cross-sectional oblique hatching is five will be described as an example of the stacking structure. A white region between the layers indicated by the hatching is also a layer. When the user designates the observation target position of the sample 6 which is an observation target, the user designates a depth (indicated by reference sign D) from a sample top surface TS, the number of layers, and the like (step 411 of FIG. 5). The depth can be designated in units of a distance such as μm. An example of the number of layers corresponding to the depth D is a third layer from above.

(B) illustrates an observation target region (in other words, a candidate region) 600 corresponding to the depth D designated in (A) in a plan view of the slope surface 60 on the X-Y plane. A straight region corresponding to the certain same layer (for example, the third layer) is the observation target region 600. In the layer, a pattern such as a channel hole 601 indicated by an ellipse is formed.

The computer system 1 acquires 3-dimensional coordinate information (X, Y, Z) at the observation target position in the SEM from the depth designated in (A) based on the association data 305 after the height correction of FIG. 3. (C) illustrates a case in which, for example, observation target positions (in other words, candidate positions) of three points (P1, P2, P3) included in the straight observation target region of (B) are automatically acquired. For example, the point P1 has 3-dimensional coordinates (X1, Y1, Z1). The 3-dimensional position coordinates of each point are acquired. When a certain layer is designated, as illustrated, for example, a central position (a position of a boundary of two adjacent layers when the two layers is a set of layers) of the layer is an observation target position (in other words, an imaging central position).

(D) illustrates a case in which an observation image with the SEM is acquired at each point of the observation target position of (C). The number of acquired observation images, a size of the observation image, and the like can be set by the user. The user can observe an observation image at an appropriate position with regard to the observation images at one or more acquired observation target positions at the same designated depth (the same layer).

[Operational Effects]

As described above, in the analysis system according to the embodiment, the user can almost automatically (automatically except for a setting or an input by the user) perform detailed observation in the SEM by moving to 2-dimensional coordinates (X, Y) of a goal depth (or layer) from the sample top surface based on the coordinate conversion from the CSI to the SEM and the association data. In this way, by observing an aimed position from accurate depth information, it is possible to analyze or evaluate a channel hole shape or the like of a sample (for example, a 3-dimensional NAND device) with high accuracy for a short time.

In the embodiment, as the coordinate conversion and the association, the 2-dimensional coordinates (xy coordinates) of depth data (depth map) measured with the CSI are associated with 2-dimensional coordinates (XY coordinates) on the SEM coordinate system. The coordinate conversion and the association can be implemented by a projective conversion method (in other words, 4-point alignment method) using, for example, the markers 7 (FIG. 4) of four points. The markers 7 which can be recognized with both the CSI and the SEM are used.

In this system, depth information of the entire slope surface 60 can be ascertained by acquiring a height map of the CSI in the entire region of the polished slope surface 60 and performing the coordinate conversion and the height correction. Therefore, this system can automatically estimate points (the plurality of observation target positions and candidates in FIG. 6) at the same depth/layer and presents the points to the user. Accordingly, there are the following advantages. When the user designates a depth/layer from the sample top surface, the user can easily image and observe only points corresponding to the depth/layer with the SEM. It is possible to measure points of the same depth/layer with high accuracy, improve a signal noise ratio, improve accuracy of length measurement, acquire a shape close to a true value, and the like.

When a certain acquired point (observation target position) is not appropriate for imaging and observation due to abnormality such as a foreign matter, different points in the same depth/layer can be set as observation target positions so as to re-obtain data. In particular, in the case of mechanical polishing, a foreign matter such as a polishing waste is likely to remain unlike the FIB. When a plurality of points in the same depth/layer are acquired as observation candidates, appropriate measure can be taken even in this case.

First Embodiment

An analysis system according to a first embodiment which is a detailed configuration example will be described with reference to FIG. 7 and subsequent drawings based on the foregoing basic configuration. [Sample]

First, a configuration example of the sample 6 will be described. The sample 6 (in other words, an observation target) is, for example, a thin piece acquired from a part of a semiconductor wafer in which various semiconductor devices are formed. Accordingly, examples of the sample 6 include, as a conceptual and specific examples, a semiconductor substrate, a semiconductor element such as a transistor formed on the semiconductor substrate, a large scale integrated circuit (LSI) device in which a plurality of transistors are highly integrated, a multi-layered wiring layer including a plurality of gate electrodes, an inter-layer insulating film formed between such layers, and a semiconductor memory device including a 3-dimensional NAND device. In an example of the first embodiment, the sample 6 is a 3-dimensional NAND device.

FIG. 7 illustrates an X-Y plane on the sample coordinate system as a plan view of the top surface of the sample 6. FIG. 8 illustrates a cross-section on an X-Z plane along the line A-A of FIG. 7. In FIG. 7, a partial region on a sample top surface 701 has the slope surface 60 subjected to and formed by a polishing process by the polishing apparatus 4 of FIG. 1, for example, a polishing apparatus such as an ion milling apparatus, an FIB, or a dimple grinder. The expanded slope surface 60 is illustrated in the lower part. The slope surface 60 in which the stacking structure is exposed is similar to the slope surface illustrated in FIG. 6.

In FIG. 8, the sample 6 has a top surface (in other words, an upper surface) TS corresponding to the sample top surface 701 in an upper side in the Z direction on the sample coordinate system and has a bottom surface (in other words, a lower surface) BS which is an opposite surface to the top surface TS in a lower side. When the top surface TS serves as a reference, a plurality of layers are included below the top surface TS. In this example, there are a first layer L1 to a ninth layer L9 including layers indicated by cross-sectional oblique hatching and white layers between the layers. In this example, a portion that has a distance (depth) 801 from the top surface TS to the first layer L1 and a portion from the bottom surface BS to the ninth layer L9 are not counted as layers, but these portions can also be counted as layers. In this example, thicknesses of layers from the first layer L1 to the ninth layer L9 are all the same thickness 802, but the present invention is not limited thereto. The layers may have different thicknesses. In the drawing, to facilitate understanding, a slope angle 803 of the slope surface 60 is illustrated as a relatively large angle. However, a slope angle of the actually formed slope surface 60 is smaller and the slope surface 60 having a larger area can accordingly be formed. Any distortion or the like in the shape of a pattern in the slope surface 60 becomes negligible in terms of accuracy.

The slope surface 60 of the sample 6 includes a plurality of patterns 61 (for example, the channel holes 601 in FIG. 6) as a stacking structure. Each pattern 61 among the plurality of patterns 61 extends, for example, in the Z direction such that a semiconductor device has a columnar structure connecting layers. The pattern 61 is, for example, a structure such as the channel hole 601 of FIG. 6, a wiring of an LSI, or a transistor in a 3-dimensional NAND device having a multi-layered structure.

In FIG. 8 or the like, a multi-layered structure (in other words, a stacking structure) 62 is configured by for example, the plurality of layers (L1 to L9) corresponding to a plurality of conductor layers such as multi-layered wiring layers and the pattern 61. In other words, the sample 6 includes a plurality of layers (for example, conductor layers) stacked in the Z direction oriented from the upper surface TS to the bottom surface BS and the pattern 61 (for example, a channel hole) as the multi-layered structure 62. Although not illustrated in detail here, the multi-layered structure 62 is formed around the plurality of patterns 61.

On the cross-section of FIG. 8, the slope surface 60 which is an observation surface is sloped at a slope angle 803 from the upper surface TS to the bottom surface BS of the sample 6. The slope surface 60 is formed as a surface inclined continuously from the upper surface TS to the bottom surface BS. A polishing process by the polishing apparatus 4 is performed to polish all the layers (for example, L1 to L9) of the multi-layered structure 62. Since a bottom portion of the slope surface 60 is located to be deeper than the lowermost layer of the multi-layered structure 62, all the layers of the multi-layered structure 62 are exposed in the slope surface 60.

In the example of FIG. 7 or the like, the slope surface 60 is a flat surface. The slope surface 60 is polished by an ion milling apparatus or an FIB as the polishing apparatus 4 to be formed. The slope surface 60 is not limited to a flat surface and may be a curved surface as will be described below. In the example of FIG. 9 or the like, the slope surface 60 is a curved surface. The slope surface 60 is polished by an ion milling apparatus or a dimple grinder as the polishing apparatus 4 to be formed.

FIG. 9 illustrates an X-Y plane of the top surface of the sample 6. FIG. 10 illustrates a cross-section on an X-Z plane along the line B-B of FIG. 9. As illustrated FIG. 9, a slope surface 902 hollowed out as a curved surface with an ellipsoidal shape is formed in a part of the top surface 901 of the sample 6, and the slope surface 60 in a part of the slope surface 902 is zoomed in. The slope surface 60 is a region of a part in the X direction in which the stacking structure 62 is exposed in the slope surface 902 which is circular in a plan view. The present invention is not limited to the slope surface 60. Since the stacking structure 62 is exposed in another region in the slope surface 902 which is circular in a plan view (as will be described below), the other region may be used in the process. The entire slope surface 902 which is circular in a plan view may be used in the process.

In FIG. 10, to facilitate understanding, the slope surface 902 is illustrated in a hemispherical shape. Actually, a slope angle of the slope curved surface is small and the slope surface 902 is formed as a more gently curved surface. In this example, the first layer L1 to the ninth layer L9 at a predetermined distance from the top surface TS are set as targets. The stacking structure 62 is configured by the first layer L1 to the ninth layer L9 and the pattern 61 (a channel hole or the like).

[Top Surface Shape Measurement Apparatus (CSI)]

FIG. 11 illustrates a configuration example of an optical interference microscope (CSI) as an example of the top surface shape measurement apparatus 2. The CSI is, for example, a white interference microscope and has a function of measuring and acquiring 3-dimensional coordinate information (FIG. 12) (for example, x, y, and z as position coordinates) of an upper surface (in other words, the top surface) of the sample 6 as a height map. The CSI includes a lens-barrel 102, a stage 109, a stage control device 110, and a general control unit C10. The general control unit C10 corresponds to a controller of the CSI.

A display device 1120 and an operational device 1121 provided inside or outside of the CSI are electrically connected to the general control unit C10. An example of the display device 1120 is a liquid crystal display and an example of the operational device 1121 is a mouse and a keyboard. The user can operate and use the CSI with the display device 1120 and the operational device 1121. When a connection configuration of the computer system 1 in FIG. 1 to the general control unit C10 is a control configuration of the CSI from the computer system 1, the display device 1120 and the operational device 1121 can be omitted.

Inside the lens-barrel 102, a white light source 103, a first beam splitter 104, a second beam splitter 105, an objective lens 106, a reference surface 107, and a camera 108 are provided.

The stage 109 and the stage control device 110 connected to the stage 109 are provided outside of the lens-barrel 102 and is stationary in the atmosphere. The sample 6 can be mounted on the stage 109 via the sample holder 8. When the sample 6 is measured with the CSI, the sample holder 8 on which the sample 6 is mounted is installed on the stage 109. In this example, the stage 109 of the CSI is a stage that can move on four axes (X, Y, Z, T) (where T is a tilt direction). The present invention is not limited thereto and the stage 109 may be another type of stage. The stage control device 110 can displace a position and a direction of the stage 109. When the stage 109 is displaced, a position and a direction of the sample 6 are displaced.

The white light source 103 releases irradiation light WL1 (an optical axis is indicated by a one-dot chain line). The first beam splitter 104 and the second beam splitter 105 splits the released irradiation light WL1 into two pieces of light, emit one piece of light WL1*a* to the reference surface 107, and emit the other piece of light WL1*b* to the top surface of the sample 6. The objective lens 106 focuses the irradiation light WL1 to converge on the sample 6 installed on the stage 109. Reflected light reflected from the reference surface 107 and reflected light reflected from the sample 6 are collected as one piece of reflected light WL2 through the first beam splitter 104 and the second beam splitter 105 to be formed as an image in the measurement camera 108.

The general control unit C10 includes an optical system control unit C11, a stage control unit C12, and a calculation unit C13 and generally controls these units. Therefore, it is assumed that control performed by each of the optical system control unit C11, the stage control unit C12, and the calculation unit C13 is performed by the general control unit C10 in some cases in description. The general control unit C10 is simply called one control unit, a controller, a control device, or the like in some cases. The general control unit C10 can be mounted in a computer system, a dedicated circuit, or the like.

The optical system control unit C11 is electrically connected to the white light source 103, the first beam splitter 104, the second beam splitter 105, the objective lens 106, and the reference surface 107 to control operations of these units. The optical system control unit C11 controls an imaging condition of the camera 108 to obtain a signal (image information) imaged by the camera 108. The optical system control unit C11 controls focus by the objective lens 106.

The stage control unit C12 is electrically connected to the stage control device 110 to control an operation of each driving mechanism included in the stage control device 110. The stage control unit C12 controls the stage control device 110 to move the stage 109, so that a position or a field of view of measurement on the top surface of the sample 6 can be set.

The calculation unit C13 includes a top surface information acquisition unit C14, an instruction input unit C15, and a storage unit C16. The calculation unit C13 has a function of performing program processing by a processor.

The top surface information acquisition unit C14 is connected to the camera 108 and converts a signal (image information) of the reflected light WL2 detected by the camera 108 into 3-dimensional coordinate information (FIG. 12) which is the height map. The 3-dimensional coordinate information is data generated based on the reflected light reflected from the top surface of the sample 6 when the top surface of the sample 6 is irradiated with the irradiation light. The 3-dimensional coordinate information is stored in a memory or the like and is output to the display device 1120 (or the computer system 1 in FIG. 1). The user can confirm the 3-dimensional coordinate information on a screen of the display device 1120 (or the display device 206 in FIG. 1).

The instruction input unit C15 receives information input on the screen of the display device 1120 (or the display device 206 in FIG. 1) by the user using the operational device 1121 (or the computer system 1 in FIG. 1). The storage unit C16 stores data information such as information regarding the sample 6, coordinates of the stage 109, information regarding an optical system, and the acquired 3-dimensional coordinate information (FIG. 12). Various types of information are stored and managed in association with each other.

FIG. 12 illustrates a configuration example of 3-dimensional coordinate information 1201 obtained by the CSI. The 3-dimensional coordinate information 1201 in FIG. 12 corresponds to the height map data 302 in FIG. 3. The 3-dimensional coordinate information 1201 is an example mounted as a table. The vertical axis (rows) and the horizontal axis (columns) are information of two directions (x, y) in which the irradiation light WL1 and the sample 6 in FIG. 11 are orthogonal. Height (z) information is input to a position of each cell in which the vertical and horizontal axes intersect each other. A height can be displayed in color in a height map of the screen by associating a value of color with the height (z) information.

[Charged Particle Beam Apparatus (SEM)]

FIG. 13 illustrates a configuration example of a scanning electron microscope (SEM) as an example of the charged particle beam apparatus 3. The SEM includes a lens-barrel 132, a sample chamber 137, and a general control unit C0. The general control unit C0 corresponds to a controller of the SEM. The SEM has a function of analyzing (in other words, observing or measuring) the sample 6 by radiating a charged particle beam EB1 to the sample 6 disposed on the stage 139 inside the sample chamber 137 from an electron gun 133 provided inside the lens-barrel 132.

The lens-barrel 132 is mounted on the sample chamber 137 to configure a charged particle beam column. The lens-barrel 132 includes the electron gun 133, a capacitor lens 134, a deflection coil 135, and an objective lens 136. The electron gun 133 can radiate the charged particle beam EB1 downwards in the z direction. The capacitor lens 134 causes the charged particle beam EB1 to converge. The deflection coil 135 scans the charged particle beam EB1 to the top surface of the sample 6 by polarized light. The objective lens 136 causes the charged particle beam EB1 to converge on the top surface of the sample 6.

Inside the sample chamber 137, the sample holder 8 for mounting and holding the sample 6, a stage (in other word, a sample stand) 139 for providing the sample holder 8, a stage control device 1310 connected to the stage 139 and driving the stage 139, and the like are installed. Although not illustrated, a mechanism conveying the sample 6 onto the stage 139, an inlet/outlet port, and the like are provided in the sample chamber 137.

When the sample 6 is observed and analyzed in the SEM, the sample holder 8 on which the sample 6 is mounted is conveyed into the sample chamber 137 through the inlet/outlet port and is installed on the stage 139. When the sample 6 is taken out from the sample chamber 137, the sample holder 8 on which the sample 6 is mounted is conveyed out of the sample chamber 137 via the inlet/outlet port.

The stage control device 1310 can displace a position and a direction of the stage 139 under the control of the stage control unit C2. When the stage 139 is displaced, a position and a direction of the sample 6 are displaced. In this example, the stage 139 of the SEM is a stage that can move on five axes (X, Y, Z, T, R). T is a tilt direction (a direction sloped with respect to the X-Y plane) and R is a rotational axis. The present invention is not limited thereto and the stage 139 may be, for example, a stage or the like that can move on four axes (X, Y, T, R) except for the Z axis.

The stage control device 1310 includes an XY axis driving mechanism that can be driven in directions (X, Y) parallel to a placement surface of the SEM, a Z axis driving mechanism that can be driven in a direction (Z) perpendicular to the placement surface, an R axis driving mechanism that can be driven in the rotational direction (R), and a T axis driving mechanism that can be driven in the tilt direction (T). These driving mechanisms can be used to analyze any point (including the markers 7) of the sample 6 and the sample holder 8 installed on the stage 139. A target point of the sample 6 is moved to a center of an imaging field of view of the SEM and is sloped in any direction by these mechanisms.

A detector 1311 is provided in the lens-barrel 132 (or may be provided in the sample chamber 137). When the charged particle beam EB1 is radiated to the top surface of the sample 6 in the observation and analysis of the sample 6, particles EM2 such as secondary electrons or reflected electrons released from the top surface of the sample 6 can be detected by the detector 1311. The detector 1311 converts the particle EM2 into an electric signal and detects the electric signal. The detector 1311 outputs the detected signal (in other words, image information).

A display device 1320 and an operational device 1321 electrically connected to the general control unit C0 are provided outside of or inside the SEM. The user operates the operational device 1321 to perform work while viewing a screen of the display device 1320. Accordingly, various types of data information are input to the general control unit C0 and various types of data information are output from the general control unit C0. When a connection configuration of the computer system 1 in FIG. 1 to the general control unit C0 is a control configuration of the SEM from the computer system 1, the display device 1320 and the operational device 1321 can be omitted.

The general control unit C0 includes a scanning signal control unit C1, a stage control unit C2, and a calculation unit C3 and generally controls these units. Therefore, it is assumed that control performed by each of the scanning signal control unit C1, the stage control unit C2, and the calculation unit C3 is performed by the general control unit C0 in some cases in description. The general control unit C0 is simply called one control unit (in other words, a controller or a control device) in some cases.

The scanning signal control unit C1 is electrically connected to the electron gun 133, the capacitor lens 134, the deflection coil 135, and the objective lens 136 to control operations of these units. For example, the electron gun 133 receives a control signal from the scanning signal control unit C1, generates the charged particle beam EB1, radiates the charged particle beam EB1 downwards to the sample 6 in the Z direction. Each of the capacitor lens 134, the deflection coil 135, and the objective lens 136 receives a control signal from the scanning signal control unit C1 and excites a magnetic field. The charged particle beam EB1 converges so that a beam diameter becomes appropriate by the magnetic field by the capacitor lens 134. The charged particle beam EB1 is deflected to scan 2-dimensionally in the X and Y directions on the top surface of the sample 6 by a magnetic field of the deflection coil 135. The charged particle beam EB1 converges again on the top surface of the sample 6 by a magnetic field of the objective lens 136. The scanning signal control unit C1 controls the objective lens 136 such that excitation strength of the objective lens 136 is adjusted to focus the charged particle beam EB1 on the top surface of the sample 6.

The stage control unit C2 is electrically connected to the stage control device 1310 and has a function of controlling an operation of each driving mechanism included in the stage control device 1310 and constantly linking a field of view of the SEM with coordinates of the stage 139.

The calculation unit C3 includes an image acquisition unit C4, an other-apparatus data reading unit C5, an instruction input unit C6, a storage unit C7, and a pattern shape analysis unit C8. The calculation unit C3 has a function of performing program processing of the processor.

The image acquisition unit C4 is connected to the detector 1311 to control the detector 1311. The image acquisition unit C4 processes a signal of the particles EM2 such as secondary electrons or reflected electrons detected by the detector 1311 to convert the signal into a photographic image 1401 as in FIG. 14. The photographic image 1401 is data that has a luminance value or the like for each 2-dimensional coordinate (X, Y). The photographic image 1401 is output to the display device 1320 (or the display device 206 in FIG. 1). The user can confirm the photographic image 1401 on a screen of the display device 1320 or the like.

FIG. 14 illustrates a configuration example of data obtained by the SEM. The data has, for example, a photographic image (in other words, image data or an observed image) 1401 and coordinate data (in other words, 2-dimensional coordinate information) 1402. The photographic image 1401 is schematically illustrated. For example, an elliptical pattern 61 in FIG. 6 or the like is shown in white on a black background. The coordinate data 1402 corresponds to the 2-dimensional coordinate information data 303 in FIG. 3.

The other-apparatus data reading unit C5 reads data information from other apparatuses including the CSI in FIG. 11. The general control unit C0 (or the computer system 1 in FIG. 1) can display data information obtained from the other apparatuses or data information generated using the data information on the screen of the display device 1320 (or the display device 206 in FIG. 1). The data information which can be displayed on the screen includes various types of data in FIG. 3. For example, a drawing in which 3-dimensional coordinate information (particular, depth information) is mapped on an observation image of the sample 6 by the SEM can be displayed on the screen based on the association data 306.

The instruction input unit C6 receives information input on the screen of the display device 1320 by the user using the operational device 21. The general control unit C0 stores data information such as information regarding the sample 6, the imaging condition of the SEM, the coordinates of the stage 139, the photographic image 1401, the coordinate data (2-dimensional coordinate information) 1402, and the height map acquired from the CSI in the storage unit C7. Various types of data information are stored and managed in association with each other.

The pattern shape analysis unit C8 analyzes shapes of the plurality of patterns (the patterns 601 in FIG. 6) included in the sample 6 based on the photographic image 1401 or the like to obtain analysis result information.

The calculation unit C3 can perform analysis of stage coordinates or a pattern shape and calculation of depth information of a multi-layered structure or the like, as will be described below, using the information received by the instruction input unit C6 and the data information stored in the storage unit C7.

The general control unit C10 of the above-described CSI or the general control unit C0 of the SEM may be integrated into one unit and mounted as a part of the computer system 1 in FIG. 1. That is, the computer system 1 in FIG. 1 may function as a controller of the CSI or a controller of the SEM. Alternatively, the computer system 1 (particularly, the analysis software 210) may be integrally mounted in the general control unit C10 of the CSI, or the computer system 1 (particularly, the analysis software 210) may be integrally mounted in the general control unit C0 of the SEM. In the following detailed example, a case in which the analysis software 210 is integrated in the general control unit C0 of the SEM will be described. In this case, in the observation and analysis of the sample 6, the user mainly operates the general control unit C0 (a computer system corresponding thereto) of the SEM to perform work. An entity of the main process related to the observation and analysis of the sample 6 is the general control unit C0 (a computer system corresponding thereto) of the SEM. The user reads height map data from the CSI to the general control unit C0 (the analysis software 210) of the SEM and performs a process such as coordinate conversion.

[Sample Holder and Marker]

FIG. 15 illustrates a configuration example of the sample holder 8 and the markers 7 used for the coordinate conversion according to the first embodiment. FIG. 15 is a plan view illustrating the sample holder 8 on which the sample 6 is mounted on the x-y plane when viewed from above. Here, the CSI coordinate system is illustrated. FIG. 16 is a sectional view illustrating the sample holder 8 of FIG. 15 on an x-z plane along the line C-C. The sample holder 8 has, for example, a mechanism that holds the sample 6 so that the sample 6 is interposed from the right and left in the x direction. The sample holder 8 includes sample fixing portions 81 that fix the sample 6 so that the sample 6 is interposed from the right and left in the x direction. The sample fixing portions 81 can move in a predetermined direction (for example, the x direction).

The sample holder 8 includes markers 7 of four points as the markers 7 for coordinate conversion. The markers 7 of four points are referred to as M1, M2, M3, and M4 to distinguish the markers from each other. In this example, as illustrated, two markers 7 are formed respectively on the upper surface of each of two right and left sample fixing portions 81. A total of four markers 7 (M1 to M4) are disposed at positions corresponding to vertexes of a rectangle. The present invention is not limited thereto. The markers 7 may be disposed near the sample 6 or may be disposed near the sample fixing portions 81 of the sample holder 8. Four markers 7 of four points are disposed at the same height.

The markers 7 are provided to perform coordinate conversion (the above-described step S4) called a projective conversion method that is more accurate than affine transformation. In the projective conversion method, coordinate conversion is performed using coordinates of four points located on the same plane.

During the coordinate conversion, the markers 7 are set as markers having edges of an μm order so that a computer or a user can ascertain or designate coordinates of the markers 7 as accurately as possible in both the SEM and the CSI. The four markers 7 preferably have different shapes so that the computer and the user can identify the markers 7. When the four markers 7 can be identified using another means together, the four markers 7 may have the same shape. In this example, the four markers 7 have a square when the basic shape thereof is viewed from above. Further, as illustrated in the enlarged view, a marker ID (in this example, a number) is engraved on the top surface of the square. Since the shape of the marker ID of each marker 7 is different, the computer and the user can identify each marker 7.

As a modification example, the markers 7 may be formed on a sample surface. When there are points with a plurality of identifiable shapes formed on the sample top surface, the points can be used as the markers 7. The user can convey the sample holder 8 on which the sample 6 is held from the CSI to the SEM as it is. When the sample holder 8 is installed inside the sample chamber 137 of the SEM, the user performs work, but a conveyance robot or the like may be used.

[Processing Flow (1)]

FIG. 17 illustrates a processing flow of the analysis system according to the first embodiment. The flow includes steps S101 to S112. The details of each step of the flow correspond to a GUI screen example to be described below.

The screen example is appropriately referred to in description.

The analysis system includes a step (S1 in FIG. 2) performed in the polishing apparatus 4 described above (FIG. 1), a step (S2 in FIG. 2) performed in the top surface shape measurement apparatus (CSI) 2, a step (S3 in FIG. 2) performed in the charged particle beam apparatus (SEM) 3, and a step (S4 or the like in FIG. 2) performed in the computer system 1 (the SEM in the first embodiment) as a method related to measurement, observation, analysis, and the like of the sample 6. Accordingly, not only the SEM or the computer system 1 but also the polishing apparatus 4 or the CSI are elements that are parts of the analysis system.

In step S101, the user installs the sample holder 8 on which the sample 6 is mounted on the stage 109 of the CSI (FIG. 11). At this time, the sample holder 8 is installed on the stage 109 in a positional relation in which the top surface (including the top surface TS and the slope surface 60 in FIG. 6 or the like) of the sample 6 faces the irradiation light WL1 (WL1*b*) of the CSI. That is, when the stage 109 is horizontal, the sample holder 8 is disposed on the x-y plane so that the top surface TS including the slope surface 60 is perpendicular to the z direction. At this time, the top surface TS is likely not to be in an ideal horizontal state, which can be coped with by correction to be described below.

In step S102, in the CSI, the general control unit C10 receives an instruction to measure a shape of the top surface of the sample 6 from the user and starts measuring the shape of the top surface of the sample 6. The shape of the top surface of the sample 6 measured by the CSI is acquired as 3-dimensional coordinate information (the 3-dimensional coordinate information 1201 of FIG. 12 and the height map data 302 of FIG. 3) and is stored in the storage unit C16.

When the shape of the top surface is measured including the positions of the markers 7 (FIG. 15) along with the sample 6 in the CSI, the position coordinates of the markers 7 are stored as part of the 3-dimensional coordinate information. When the 3-dimensional coordinate information of only the slope surface 60 of the sample 6 is acquired without including the positions of the markers 7 in the CSI, the 3-dimensional coordinate information of the markers 7 are acquired separately based on the stage coordinates of the CSI and is stored in association with the 3-dimensional coordinate information of the sample 6.

In step S102, when the height map (3-dimensional coordinate information) of the CSI is acquired, the user can also determine performance of the sample 6 using data of the height map before the sample 6 is inserted into the SEM for observation.

In step S103, the general control unit C10 of the CSI (or the computer system 1) performs surface correction on the 3-dimensional coordinate information acquired in step S102. The surface correction is not essential, but accuracy can be improved when the surface correction is performed. In step S103, a slope of the entire sample 6 which may occur depending on an installation state of the sample 6 in the CSI is corrected through the surface correction. The surface correction is correction in which the top surface of the sample 6 is parallel to an installation surface (for example, a horizontal surface) of the stage 109 without being sloped in the 3-dimensional coordinate information (height map). As the surface correction, one-surface proximity correction or the like can be applied. By performing the surface correction, it is possible to improve accuracy of the 3-dimensional coordinate information acquired in the CSI and it is possible to improve accuracy of each process using the subsequent 3-dimensional coordinate information.

In step S104, the user conveys the sample holder 8 on which the sample 6 is mounted from the CSI to the SEM. The user installs the sample holder 8 on the stage 139 inside the sample chamber 137 of the SEM (FIG. 13). At this time, the sample holder 8 is installed on the stage 139 in a positional relation in which the top surface (the top surface TS including the slope surface 60 in FIG. 6 or the like) of the sample 6 faces the charged particle beam EB1 from the electron gun 133. When the installation surface of the stage 139 is horizontal, the top surface of the sample 6 is disposed on an X-Y plane perpendicular to the Z direction.

The user reads the 3-dimensional coordinate information (height map) after the surface correction in step S103 to the general control unit C0 of the SEM. The general control unit C0 stores the 3-dimensional coordinate information (height map) in the storage unit C7 in response to an operation of the user.

In step S105, irradiation of the charged particle beam EB1 by the SEM is started as imaging preparation. At this time, when the user operates the operational device 1321 while viewing the screen of the display device 1320, the charged particle beam EB1 by the EM is radiated. As imaging preparation, based on an operation of the user, an observation condition (in other words, an imaging condition) of the charged particle beam EB1 of the SEM is set. At this time, when the user operates the operational device 1321 while viewing the screen of the display device 1320, the observation condition is set. Subsequently, the user focuses the charged particle beam EB1 on the top surface of the sample 6 and performs general alignment including a change in magnification or the like. The preparation of step S105 may be performed at a stage at which imaging is actually performed subsequently.

In step S106, the analysis software 210 (also referred to as an application) is started in response to an operation of the user. When the application is started, an operational screen as in FIG. 18 is displayed on a display screen of the display device 1320. On the operational screen, a title is particularly written as "3-dimensional alignment function". A function of the analysis system can implement 3-dimensional alignment through the coordinate conversion and association with the CSI data in the SEM.

The operational screen of FIG. 18 is used mainly for the user to input an instruction to the general control unit C0 and for the user to obtain each piece of information from the general control unit C0. The operational screen is used for coordinate conversion or the like in which the 3-dimensional coordinate information of the CSI is associated with the coordinates (2-dimensional coordinate information) of the sample 6 (or the stage 139) installed in the SEM based on the instruction or the information. The user can set or designate necessary information while viewing the operational screen and can almost automatically executes a series of operations related to the coordinate conversion or the like in an application to display a result. The user can appropriately execute each operation as a manual operation on the operational screen.

Steps S107 to S110 of FIG. 17 correspond to a preparation process for an automatic execution process of a series of operations related to the coordinate conversion or the height correction which is the present process of the analysis software 210. Hereinafter, an example of a case in which the series of operations related to the coordinate conversion are automatically performed will be described. The user confirms, sets, and inputs general information on the operational screen and subsequently presses an execution button. Then, the series of processes such as the coordinate conversion by the application are automatically performed and results are displayed on the screen and stored. When the user desires to perform a manual operation, a GUI such as a button for each operation is provided in the screen, and thus the user can operate a button or the like of a desired operation, so that only the operation can be performed and a result can be output.

[Operational Screen]

On the operational screen of FIG. 18, an automatic coordinate conversion execution button B1, an automatic coordinate conversion pause button B2, an automatic coordinate conversion stop button B3, and a condition setting field 1801 are provided. The three buttons (B1, B2, and B3) are buttons for operations related to automatic execution of the series of operations (steps S4 and S5 of FIGS. 2 and S111 of FIG. 17) related to the coordinate conversion or the like in which the 3-dimensional coordinate information of the CSI is associated with the 2-dimensional coordinate information of the SEM.

The condition setting field 1801 includes a 3-dimensional coordinate information (CSI data) selection button B4, a marker pattern image selection field 1802 (a low-magnification selection button B5, a middle-magnification selection button B6, and a high-magnification selection button B7), a marker position coordinate registration field 1803 (a marker position coordinate registration button B8), a sample information input field 1804 (a number-of-layers input button B9, a one-layer thickness input button B10, and a sample information registration button B11), a height reference coordinate registration field 1805 (a correction method selection button B12, a 2-dimensional information display field B13, a height reference coordinate input field B14, and a height reference coordinate registration button B15) in this order from the top.

In step S107, the 3-dimensional coordinate information stored in the storage unit C7 of the SEM in step S104 is called when the user operates the CSI data selection (3-dimensional coordinate information reference) button B4. The processor of the general control unit C0 reads various types of data on the memory, performs a process based on a program, and appropriately stores a processing result in the storage unit C7.

In step S108, a photographic image of the markers 7 (FIG. 15) for the coordinate conversion acquired in advance on the SEM are stored as an image for pattern matching of the markers 7 (a marker pattern image) in a predetermined location of the storage unit C7. When the user selects and operates image registration buttons (B5, B6, and B7) in accordance with a designated resolution, the photographic image (the marker pattern image) is registered.

The image for the pattern matching of the markers 7 is an image in which some or all of the markers 7 for performing the coordinate conversion are cut out. In this example, images of three types of resolutions (magnifications) such as a low magnification (LM), a middle magnification (MM), and a high magnification (HM) can be registered. The image for the pattern matching of the markers 7 is used to automatically detect position coordinates (X, Y) of the markers 7 for pattern matching during the coordinate conversion. Here, in the image for the pattern matching of the markers 7, positions serving as marks such as edges of the markers 7 are disposed at the center. In this example, a pattern of each resolution can be selected and set for pattern matching with higher accuracy.

In step S109, the position coordinates of the markers 7 for the coordinate conversion are registered. The user confirms and registers the position coordinates of the markers 7 in the marker position coordinate registration field 1803. In the marker position coordinate registration field 1803, coordinates (x, y) of the centers of the markers 7 acquired in the CSI and coordinates (X, Y) of the centers of the markers 7 acquired in the SEM which are stored in advance in the storage unit C7 are registered by the number of markers 7 used during the coordinate conversion. At this time, when the user confirms the coordinates of the markers 7 (in this example, three) of the table of the marker position coordinate registration field 1803 and then operates a marker position coordinate registration button B8, marker position coordinate information is registered.

In the marker position coordinate registration field 1803, the processor may input and present values automatically at an early stage. In the case of an automatic input, for example, as 2-dimensional coordinates (x, y) of the CSI, 2-dimensional coordinates (x, y) of the markers 7 on an external CSI stage coordinate system of the height map of the CSI are input. In the case of a user input, the user may view data of the CSI map or the like on the screen and input 2-dimensional coordinates (x, y) of the markers 7. For 2-dimensional coordinates (X, Y) of the SEM, in the case of an automatic input, the processor inputs position coordinates of the markers 7 detected from the photographic image. Alternatively, in the case of a user input, the user may designate and input the positions of the markers 7 from the photographic image of the SEM on the screen.

The operations of steps S107 and S109 can also be implemented as operations of executing an application of step S111 to be described below. In this case, operations of the user can be limited as minimum as possible and operations can be fully automated.

In step S110, information regarding the sample 6 is input, height reference coordinates are designated, and any observation position is designated (set). First, as an input of the information regarding the sample 6, the user inputs information regarding the sample 6 (3-dimensional NAND device) in the sample information input field 1804. In this example, in the sample information input field 1804, the number of layers of a multi-layered structure (the multi-layered structure 62 or the like in FIG. 7) can be input with the number-of-layers input button B9, and a thickness (nm unit) of one layer of the multi-layered structure can be input with the one-layer thickness input button B10. In the modification example, when the thickness of each layer is different, the thickness of each layer or a depth at which the first layer of the multi-layered structure begins (a distance from the top surface TS to the first layer and the distance 801 in FIG. 8) can be input in the sample information input field 1804. The user can confirm the input value, and then operate the sample information registration button B11 for registration.

The input of the sample information is not limited to a manual input of the user. For example, the design data 301 of FIG. 3 may be used. It is possible to obtain various types of information including information regarding the pattern or the stacking structure included in the design data 301 of the sample 6. The processor may extract information such as the number of layers, the thickness of one layer, a depth from the top surface to the first layer from the design data 301.

Here, the calculation unit C3 of the general control unit C0 can acquire depth information of the multi-layered structure of the sample 6 and information regarding the number of layers by combining the sample information (the number of layers of the multi-layered structure, the thickness of one layer or the thickness of each layer, and the depth at which the first layer of the multi-layered structure begins, or the like) input by the user with the 3-dimensional coordinate information of the CSI.

That is, the calculation unit C3 can know how deep a predetermined position in the 3-dimensional coordinate information of the CSI is from the top surface TS of the sample 6 and to which layer of the multi-layered structure the predetermined position corresponds to. In other words, the depth information of the multi-layered structure includes the number of layers and the depth of the predetermined position on the 3-dimensional coordinate information from the top surface TS of the sample 6.

In designation of the height reference coordinates in step S110, the user registers the height reference coordinates in the height reference coordinate field 1805. The user displays a secondary electron or reflected electron image on the display device 1320 of the SEM, and first moves a first point of the multi-layered structure to the center of a display area B13 of the secondary electron or reflected electron image using the operational device 1321. The user operates the height reference coordinate registration button B15 at coordinates of the center. The first point is a point of the first layer of the multi-layered structure in this example. In this example, the stacking structure 62 when the slope surface 60 illustrated in FIG. 9 is a curved surface is shown in an image of the display area B13. In this example, in a region in a ring shape of the first layer, the first point is set as a height reference position. Accordingly, the general control unit C0 designates the first point as first height reference coordinates (X1, Y1). The designated height reference coordinates are stored in the storage unit C7. Similarly, in the height reference coordinate field 1805, another point considered to be at the same height as the first point of the multi-layered structure is registered as the height reference coordinates.

The example of FIG. 18 shows a case in which "two-point correction" is selected in the correction method button B12 and two points (first and second points) are designated as height reference coordinates. The display area B13 shows a case in which two points (P1 and P2) facing each other in the region in the ring shape in the same first layer are designated as first height reference coordinates (X1, Y1) and second height reference coordinates (X2, Y2). In the right table B14, values (X, Y) of each height reference coordinates are displayed.

FIG. 19 illustrates a case in which, as another example, "3-point correction" is selected as a correction method in the height reference coordinate field 1805, and three points (first, second, and third points) are designated as the height reference coordinates. In the display area B13, three points (P1, P2, and P3) which are vertexes of a substantial triangle in the region in the ring shape in the same layer are designated as first height reference coordinates (X1, Y1), second height reference coordinates (X2, Y2), and third height reference coordinates (X3, Y3).

When the 2-point correction is selected as the correction method in the designation of the height reference coordinates, as in FIG. 18, and only the first and second points are registered, as illustrated in FIG. 21, the calculation unit C3 performs 2-dimensional height correction using two points. At this time, as the height correction method, primary linear approximation correction or the like can be applied, but the present invention is not limited thereto.

When the first to third points are designated in the designation of the reference coordinates as in FIG. 19, as illustrated in FIG. 22, the calculation unit C3 performs 3-dimensional height correction using three points. At this time, as the height correction method, primary surface approximation correction or the like can be applied, but the present invention is not limited thereto.

In this example, the first layer of the multi-layered structure 62 is a layer (the first layer L1) closest to the top surface TS of the sample 6 as in FIG. 9 or the like and corresponds to the uppermost layer of the multi-layered structure 62.

In the sample 6 in which the multi-layered structure can be clearly confirmed in the SEM, for example, layers in which the number of layers can be easily confirmed like the first layer of the multi-layered structure are easily designated to height reference coordinates. However, depending on the sample 6, it is also assumed that the multi-layered structure cannot be clearly confirmed. In this case, for example, a position of a specific pattern of the sample 6 or a position of a structure with another shape can also be designated as height reference coordinates (X, Y).

A screen of FIG. 20 is a portion continuous from the operational screen of FIG. 18. In particular, an observation position setting field 1806 and a height display field 1807 of a display field of view are illustrated. The observation position setting field 1806 includes an input box B16 of "the number of layers from the top surface" and an input box B17 of "the depth from the top surface".

In setting of any observation target position in step S110, as illustrated in FIG. 20, as a method of setting an observation position, the user selects/inputs the number of layers from the top surface TS of the sample 6 in the input box B16 of "the number of layers from the top surface" and selects/inputs the depth from the top surface TS in the input box B17 of "the depth from the top surface". Accordingly, direct movement to the designated number of layers or the position of the depth is possible. When the number of layers or the depth is designated, a height map or the like of the CSI may be displayed on the screen and may be indicated by color display on the height map so that the user knows the designated point. In this example, the height map (schematically indicated) of the CSI is displayed in the display area B18 and the layer in the ring shape is displayed on the top surface so as to be known when the slope surface 60 as in FIG. 9 is a curved surface. On the display, the user can specifically designate an observation field of view (position) by performing an operation such as a click of a mouse or the like.

The 2-point correction and the 3-point correction have been described as the setting of the height reference coordinates, but the setting of the height reference coordinates may be a height setting in which at least one point of the sample is used. When the horizontal surface setting of CSI coordinates or SEM coordinates is completed or unnecessary, the setting of one point can be performed as a height setting.

In a right table B19, each observation position coordinates designated in the display area B18 are displayed. Alternatively, each observation position coordinates can be input in the table B19. One observation position coordinates and one observation field of view have a correspondent relation.

For example, when a variation in a structure in the same layer is evaluated, a plurality of points are designated as observation regions in the same layer. In the example of the display area B18 in FIG. 20, for example, observation regions (observation position coordinates) of four points indicated by Numbers 1 to 4 in a fiftieth layer are designated. Alternatively, for example, observation regions (observation position coordinates) of four points indicated by Numbers 5 to 8 in a one hundredth layer are designated. In this way, by designating a plurality of observation regions in the same layer, it is possible to evaluate a variation in the structure in the same layer.

For example, when a variation in a structure over a plurality of layers is evaluated, a plurality of observation regions over the plurality of layers may be designated. For example, two points indicated by Numbers 1 and 5 are designated or two points indicated by Numbers 2 and 6 are designated. When a single field of view is observed, a single field of view (observation position coordinates) can also be designated. The designated observation regions are observed in an order of the numbers or are observed in any order selected by the user.

When the observation target positions are designated in step S110, observation target regions may be limited on a GUI screen and observation target positions may be designated in the limited regions. For example, in the example of the sample 6 in FIG. 9, only some regions on the slope surface 902 are limited as observation target regions (the slope surface 60). As another limiting method, a line corresponding to a cut section (longitudinal section) may be designated by the user. For example, in the example of FIG. 9, a line along which a cut section is taken in a perpendicular direction as in FIG. 10 can be designated at any position in a region of the circular slope surface 902 (for example, a line at any angle around a central point of a circle). The processor sets a cut section corresponding to the designated line as a limited region, and a point designated in the limited region by the user is set as an observation target position.

As a modification, another processing flow configuration example may be as follows. Even in a state in which the user does not input and set information regarding all items on an operational screen, the processor temporarily executes the application of step S111 and performs coordinate conversion and association between the CSI and the SEM. Thereafter, the user can set, for example, a height reference position or the like on the operational screen and the processor can perform height correction using the height reference position.

[Processing Flow (2)]

In step S111, the application of the analysis software 210 is performed. When the user operates the automatic coordinate conversion execution button B1 of the operational screen, the application (the general control unit C0 of the SEM) performs a process such as coordinate conversion automatically based on various types of data information input and set in steps S107 to S110.

First, when the automatic coordinate conversion execution button B1 is operated, a magnification similar to the low-magnification image for the pattern matching of the markers 7 is set in the SEM. Subsequently, the general control unit C0 calls the 3-dimensional coordinate information of the CSI stored in the storage unit C7 and extracts information regarding the coordinates of the markers 7 for the coordinate conversion included in the 3-dimensional coordinate information. The general control unit C0 calculates coordinates of the marker 7 on the SEM from the information and moves the stage 139 to the vicinity of the first point (the first marker M1) of the marker 7.

Next, the general control unit C0 reads the low-magnification image of the marker pattern image read in step S108 and performs a pattern matching process using an image of the first point of the marker 7 acquired at a low magnification. After the pattern matching, the general control unit C0 calculates a deviation amount of the central position of the marker 7 from the marker pattern image and stores correct coordinates of the marker 7 in the storage unit C7. This operation is performed similarly on the other three points (M2 to M4) of the markers 7.

Further, the general control unit C0 performs similar operations in order using the middle-magnification image and the high-magnification image for the pattern matching of the markers 7 and accurately registers the coordinates of the markers 7 on the SEM. At this time, an imaging magnification of the marker pattern image and the magnification of the secondary electron or reflected electron image displayed in the display area of the secondary electron or reflected electron image on the display device 1320 of the SEM are set to the same magnification.

The general control unit C0 calculates a conversion coefficient of the projective conversion method using xy coordinate information of the markers 7 on the 3-dimensional coordinate information of the CSI and XY coordinate information of the markers 7 on the SEM, and converts all the xy coordinates of the 3-dimensional coordinate information of the CSI into XY coordinates on the SEM using the projective conversion method.

Subsequently, the general control unit C0 corrects a height of the 3-dimensional coordinate information after the coordinate conversion so that the positions are at the same height using the reference height coordinates of, for example, three points registered in step S110 (FIGS. 21 and 22). As the height correction method, for example, primary surface approximation correction or the like is applied.

FIGS. 21 and 22 illustrate an example of height correction. In the height correction, the user designates two or more points as reference positions considered to be at substantially the same height or depth. Specifically, when two or more points are designated from regions of the same layer, the positions of the two or more points are at substantially the same height or depth. Alternatively, the processor may automatically extract two or more points as reference positions considered to be at substantially the same height or depth in the same layer based on the design data 301, the height map, a photographic image of the SEM, or the like. The general control unit C0 performs the height correction using the plurality of reference positions. Accordingly, the coordinate information after the height correction is ensured with high accuracy in designation of the layer or the depth. A form in which the height correction is not performed is also possible.

The height correction will be supplemented. After the coordinate conversion, it is necessary to perform the height correction. This is because, when there is a slope or the like which cannot be corrected through the surface correction (step S103 in FIG. 17) on the entire sample 6, the depth and the number of layers are not matched with high accuracy only in a result of the surface correction and it is not possible to make observation at the XY position of the number of layers required by the user. In consideration of the slope or the like, the height correction is performed to match the depth and the number of layers with high accuracy. For example, three points (three points at substantially the same height in the same layer) observed with the SEM are used. In the height correction, information indicating that the three points are at the same layer is used. When three points are used as in FIG. 22, correction on a surface (3-dimensional height correction) is possible. When two points are used as in FIG. 21, correction in a line (2-dimensional height correction) is possible.

The general control unit C0 associates the number of layers with the depth from the sample top surface in the 3-dimensional coordinate information after the height correction based on the information input in step S110. Accordingly, the user can designate observation positions with not only the depth but also with the number of layers.

Finally, the general control unit C0 moves the stage 139 to the observation position registered in step S110 by controlling the stage control device 1310 from the stage control unit C2. The general control unit C0 irradiates the top surface TS of the sample 6 with the charged particle beam EB1 in the Z direction under the control of the scanning signal control unit C1 and performs focusing at the observation position registered in step S110 for imaging using the objective lens 136.

When the number of observation positions designated in step S110 is plural, for example, the plurality of observation positions can be imaged and observed by performing a process continuously and automatically in an order from the upper portion of, for example, the operational screen of FIG. 18 or an order designated by the user. Further, when the imaging of an aimed image at the designated observation position fails, the observation image can be determined to be good or poor automatically by an image processing technology or the like and a nearby image can also be captured automatically. The imaging fails, for example, when a field of view in which there is a foreign matter such as a waste on the top surface of the sample 6 is imaged or when a field of view which is an unintended structure is imaged.

Each coordinates and depth information of the multi-layered structure acquired in step S111 or the like are recorded as a recording table as in FIG. 23 and are stored in the storage unit C7. The recording table of FIG. 23 includes, as items, a number, a file (observation image), coordinates (X, Y), a depth (D) from the sample top surface, the number of layers (L) from the sample top surface, and an analysis pattern file. The analysis pattern file is a file of a result of pattern analysis to be described below. The general control unit C0 can acquire the depth (D) of the position from the top surface TS of the sample 6 and the number of layers (L) by calculating a predetermined position on a WD profile as a basis.

As described above, the analysis system can acquire the 3-dimensional information of the sample 6 in an nm order and acquire depth information of the multi-layered structure quickly and accurately.

Depending on the sample 6, the observation surface (the slope surface 60) formed through the polishing process does not have a desired top surface shape in some cases. For example, there is an unevenness on an observation surface in some cases. In these cases, the user can quickly determine whether the shape of the observation surface is successful in accordance with the 3-dimensional coordinate information of the CSI. For example, when there is a large difference in the unevenness of the observation surface, the user can use another observation range of the same height.

Analysis

In step S112, the general control unit C0 analyzes the plurality of patterns (for example, the pattern (channel hole) 601 and the pattern 61 in FIGS. 6 to 10) included in the sample 6.

FIG. 24 illustrates an operational screen for pattern analysis. The user performs work for the pattern analysis while viewing the screen. The operational screen of FIG. 24 includes a photographic image display field 2401, an image reading setting field 2402, a pattern detection button B31, and a pattern analysis button B32. The image reading setting field 2402 includes a reading button B33 and a reference button B34.

In the image reading setting field 2402, the user inputs the number of layers (L) or the depth (D) of the sample 6 and operates the reading button B33. Accordingly, the general control unit C0 displays a photographic image captured with the SEM in step S112 in the photographic image display field 2401. When the user operates the reference button B34, the user can also select and refer to a previously acquired photographic image. In this example, in the photographic image display field 2401, a top surface including the pattern 61 when the slope surface 60 is a flat surface as in FIG. 7 or the like is shown. Each pattern 61 is elliptical. Here, the shape of the layer is not illustrated.

Subsequently, when the user operates the pattern detection button B31, the general control unit C0 detects the plurality of patterns 61 using an image recognition technology, assigns numbers for identifying to the plurality of patterns 61, and also displays the numbers in the photographic image display field 2401.

FIG. 25 illustrates a table (pattern information field) in which information regarding the plurality of patterns 61 detected in the photographic image of the photographic image display field 2401 is displayed. The general control unit C0 displays this table in the screen of FIG. 24. This table includes a pattern number, a pattern major-axis diameter, a pattern minor-axis diameter, a pattern average diameter, and pattern roundness as items.

Subsequently, when the user operates the pattern analysis button B32, the pattern shape analysis unit C8 automatically measures a diameter of each of the plurality of patterns 61 at the observation coordinates (x, y, z) using an image recognition technology. The pattern shape analysis unit C8 acquires pattern shape information such as a major-axis diameter, a minor-axis diameter, an average diameter, and roundness in each of the plurality of patterns 61. The pattern shape information is displayed in the table of FIG. 24 and is stored in the storage unit C7. Arrows described in the patterns 61 in FIG. 24 indicate a major-axis diameter and a minor-axis diameter. When an area of the region of the pattern 61 is calculated and the pattern shape is assumed to be complete round, the pattern average diameter corresponds to a radius calculated from the area. The roundness can be calculated from the major-axis diameter and the minor-axis diameter and indicates proximity of the shape of the pattern 61 to the complete roundness. In this example, some patterns 61 (Number 1) has a short minor-axis diameter with respect to the major-axis diameter and low roundness. From this, a possibility of a processing defect can be estimated.

The observation coordinates (x, y, z) described here are coordinates of a central position of a photographic image which is observed. Accordingly, the calculated number of layers is the number of layers at the central position of the photographic image which is observed.

The general control unit C0 can record the acquired pattern shape information in a recording table (pattern information) as in FIG. 25 and output the pattern shape information in association with the observed photographic image. The general control unit C0 stores a file of the pattern information in association with a column of the "pattern analysis file" of the recording table of FIG. 23.

Further, the observation image acquired in step S111 and the pattern analysis result obtained in step S112 can be displayed simultaneously in association with the observation position indicated on the 3-dimensional height map, as illustrated in FIG. 26. In a table 2601, an analysis result 2603 is displayed in association with observation position coordinates 2602. In an observation image field 2604, an observation image at each observation position is displayed, and thus the user can confirm the observation image.

As described above, the analysis system according to the first embodiment can acquire depth information of the multi-layered structure 62 of the sample 6 and can also acquire pattern shape information of a plurality of patterns included in the sample 6 by analysis based on the coordinate conversion and link between the CSI and the SEM.

According to the first embodiment, the scheme in which the user designates the depth or the layer from the sample top surface and then observes the position of the designated depth or layer with the SEM has been mainly described. The present invention is not limited thereto. In the first embodiment, similarly to the function (B) of FIG. 5, the sample 6 can first be observed with the SEM to automatically calculate the depth (in other words, a height of a display field of view) or the layer from the sample top surface in the observed region.

In the height display field 1807 of the display field of view in the lower part of the screen of FIG. 20, at a desired point 2001 designated by the user in the photographic image (display field of view) of the SEM, the general control unit C0 automatically calculates the depth (in other words, the height of the display field of view) or the layer from the sample top surface and displays the depth or the layer in a number-of-layers field B21 from the top surface and a depth field B22 from the top surface.

The present invention has been described specifically based on the embodiments, but the present invention is not limited to the above-described embodiments and can be modified in various forms without departing from the gist of the present invention.

REFERENCE SIGNS LIST

1: computer system
2: top surface shape measurement apparatus (CSI)
3: charged particle beam apparatus (SEM)
4: polishing apparatus
5: MES
6: sample
7: marker
8: sample holder
210: analysis software

The invention claimed is:

1. An analysis system comprising a computer system, wherein the computer system acquires 3-dimensional coordinate information of a top surface shape of a sample having a stacking structure, the 3-dimensional coordinate information being measured by a top surface shape measurement apparatus, acquires 2-dimensional coordinate information based on a photographic image of the sample imaged by a charged particle beam apparatus, performs coordinate conversion for association between the 3-dimensional coordinate information of the top surface shape measurement apparatus and the 2-dimensional coordinate information of the charged particle beam apparatus and acquires association data, which is a result, and acquires depth information regarding a depth or a number of layers from a top surface of the sample having the stacking structure based on the association data, wherein the computer system acquires 3-dimensional coordinates of an observation target position based on the association data in response to a designation of the depth information as the observation target position in the charged particle beam apparatus, and controls the charged particle beam apparatus and acquires an observation image at the observation target position, and wherein neither of the top surface shape measurement apparatus and the charged particle beam apparatus is a focused ion beam apparatus.

2. The analysis system according to claim 1, wherein the depth information is information regarding a depth or the number of layers from a top surface of the sample.

3. The analysis system according to claim 1, wherein the computer system acquires depth information of 2-dimensional coordinates based on the association data in response to a designation of the 2-dimensional coordinates on a photographic image in the charged particle beam apparatus, and displays the depth information on a screen.

4. The analysis system according to claim 1, wherein the computer system performs height correction to equalize coordinate heights on the association data using reference position coordinates in the stacking structure of the sample after the coordinate conversion.

5. The analysis system according to claim 1, wherein the coordinate conversion is performed by a projective conversion method using markers of three points or more.

6. The analysis system according to claim 5, wherein the markers of the three points or more are formed on a top surface of the sample or a sample holder of the sample.

7. The analysis system according to claim 1, wherein a top surface of the sample has a slope surface which is formed by polishing and in which the stacking structure is exposed.

8. The analysis system according to claim 1, wherein the computer system acquires a plurality of position coordinates at the same depth or layer which are candidates as 3-dimensional coordinates of the observation target position based on the association data in response to a designation of the depth information as the observation target position in the charged particle beam apparatus, and controls the charged particle beam apparatus at an observation target position selected from the candidates and acquires an observation image at the observation target position.

9. The analysis system according to claim 1, wherein the top surface shape measurement apparatus is an optical interference microscope.

10. The analysis system according to claim 1, wherein the charged particle beam apparatus is a scanning electron microscope.

* * * * *